(12) United States Patent
Tsunoda et al.

(10) Patent No.: US 11,250,993 B2
(45) Date of Patent: Feb. 15, 2022

(54) THIN-FILM CAPACITOR AND METHOD FOR MANUFACTURING THIN-FILM CAPACITOR

(71) Applicant: TDK Corporation, Tokyo (JP)

(72) Inventors: Koichi Tsunoda, Tokyo (JP); Kazuhiro Yoshikawa, Tokyo (JP); Mitsuhiro Tomikawa, Tokyo (JP); Kenichi Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 57 days.

(21) Appl. No.: 16/617,106

(22) PCT Filed: May 16, 2018

(86) PCT No.: PCT/JP2018/018974
§ 371 (c)(1),
(2) Date: Nov. 26, 2019

(87) PCT Pub. No.: WO2018/221228
PCT Pub. Date: Dec. 6, 2018

(65) Prior Publication Data
US 2020/0258690 A1   Aug. 13, 2020

(30) Foreign Application Priority Data

| May 31, 2017 | (JP) | JP2017-107849 |
| May 31, 2017 | (JP) | JP2017-108223 |
| May 31, 2017 | (JP) | JP2017-108226 |

(51) Int. Cl.
*H01G 4/33* (2006.01)
*H01G 4/01* (2006.01)
*H01G 4/232* (2006.01)

(52) U.S. Cl.
CPC ............... *H01G 4/33* (2013.01); *H01G 4/01* (2013.01); *H01G 4/232* (2013.01)

(58) Field of Classification Search
None
See application file for complete search history.

(56) References Cited

U.S. PATENT DOCUMENTS

| 4,283,753 A | 8/1981 | Burn |
| 5,195,018 A | 3/1993 | Kwon et al. |

(Continued)

FOREIGN PATENT DOCUMENTS

| JP | H08-97310 A | 4/1996 |
| JP | H10-93041 A | 4/1998 |

(Continued)

OTHER PUBLICATIONS

Translation of JP2008263005 (Year: 2008).*
International Preliminary Report on Patentability dated Dec. 12, 2019 for PCT/JP2018/018974.

*Primary Examiner* — Dion R. Ferguson
(74) *Attorney, Agent, or Firm* — Faegre Drinker Biddle & Reath LLP

(57) ABSTRACT

A thin-film capacitor includes an insulating base member, and a capacitance portion that is laminated on the insulating base member has a plurality of internal electrode layers which are laminated on the insulating base member and are provided in a lamination direction and dielectric layers which are sandwiched between the internal electrode layers. A relative dielectric constant of the dielectric layers is 100 or higher.

12 Claims, 11 Drawing Sheets

(56) References Cited

U.S. PATENT DOCUMENTS

| | | |
|---|---|---|
| 5,633,181 A | 5/1997 | Hayashi |
| 5,822,175 A | 10/1998 | Azuma |
| 5,929,473 A | 7/1999 | Nishihori et al. |
| 6,027,947 A | 2/2000 | Evans et al. |
| 6,225,185 B1 | 5/2001 | Yamazaki et al. |
| 2002/0102768 A1 | 8/2002 | Shioga et al. |
| 2002/0122287 A1 | 9/2002 | Mido et al. |
| 2003/0071300 A1* | 4/2003 | Yashima .......... H01G 4/33 257/310 |
| 2004/0018693 A1 | 1/2004 | Shioga et al. |
| 2004/0130849 A1 | 7/2004 | Kurihara et al. |
| 2004/0217445 A1 | 11/2004 | Sakashita et al. |
| 2004/0245561 A1 | 12/2004 | Sakashita et al. |
| 2005/0142733 A1* | 6/2005 | Kurihara .......... H01L 28/40 438/250 |
| 2005/0146838 A1 | 7/2005 | Shioga et al. |
| 2005/0156279 A1 | 7/2005 | Shioga et al. |
| 2006/0044734 A1 | 3/2006 | Ahn et al. |
| 2006/0245139 A1 | 11/2006 | Kariya |
| 2006/0250749 A1 | 11/2006 | Kurihara et al. |
| 2007/0034989 A1 | 2/2007 | Shioga et al. |
| 2007/0121273 A1* | 5/2007 | Yamamoto .......... H05K 1/186 361/306.2 |
| 2007/0139859 A1 | 6/2007 | Osaka et al. |
| 2007/0141800 A1* | 6/2007 | Kurihara .......... H05K 1/0231 438/396 |
| 2007/0146980 A1 | 6/2007 | Ahn et al. |
| 2007/0241379 A1 | 10/2007 | Sakashita et al. |
| 2008/0068780 A1 | 3/2008 | Shioga et al. |
| 2008/0145996 A1 | 6/2008 | Nomura et al. |
| 2008/0164563 A1 | 7/2008 | Nomura et al. |
| 2008/0315358 A1 | 12/2008 | Shioga et al. |
| 2009/0007405 A1 | 1/2009 | Shioga et al. |
| 2009/0021889 A1* | 1/2009 | Tanioku .......... H01L 28/40 361/321.5 |
| 2009/0201624 A1 | 8/2009 | Hattori et al. |
| 2010/0118468 A1 | 5/2010 | Nomura et al. |
| 2010/0246089 A1 | 9/2010 | Yano et al. |
| 2011/0044011 A1 | 2/2011 | Ohtsuka et al. |
| 2011/0075319 A1 | 3/2011 | Oikawa et al. |
| 2011/0110016 A1 | 5/2011 | Takeshima et al. |
| 2011/0128669 A1 | 6/2011 | Yano et al. |
| 2012/0104545 A1 | 5/2012 | Takeshima et al. |
| 2015/0022938 A1* | 1/2015 | Okada .......... H01G 4/015 361/278 |
| 2015/0325368 A1* | 11/2015 | Namikawa .......... H01G 2/10 361/272 |
| 2016/0027579 A1 | 1/2016 | Kurachi et al. |
| 2016/0064473 A1 | 3/2016 | Morito et al. |
| 2016/0209441 A1* | 7/2016 | Mazzeo .......... G06F 3/0444 |
| 2016/0254095 A1 | 9/2016 | Shin |
| 2018/0053602 A1 | 2/2018 | Chien |
| 2019/0279823 A1* | 9/2019 | Kumagae .......... H01G 4/306 |

FOREIGN PATENT DOCUMENTS

| | | | |
|---|---|---|---|
| JP | 2002-222925 A | | 8/2002 |
| JP | 2002-231576 A | | 8/2002 |
| JP | 2004-214589 A | | 7/2004 |
| JP | 2007-81325 A | | 3/2007 |
| JP | 2007-280998 A | | 10/2007 |
| JP | 2008263005 | * | 10/2008 ... H01L 2224/16145 |
| JP | 2008-277520 A | | 11/2008 |
| JP | 2009-194096 A | | 8/2009 |
| JP | 2010-225849 A | | 10/2010 |
| JP | 2011-40571 A | | 2/2011 |
| JP | 2011-77343 A | | 4/2011 |
| JP | 2014-90077 A | | 5/2014 |
| JP | 2015-216246 A | | 12/2015 |
| JP | 2016-167619 A | | 9/2016 |
| WO | WO-2015/041447 A1 | | 3/2015 |

* cited by examiner

Fig.6
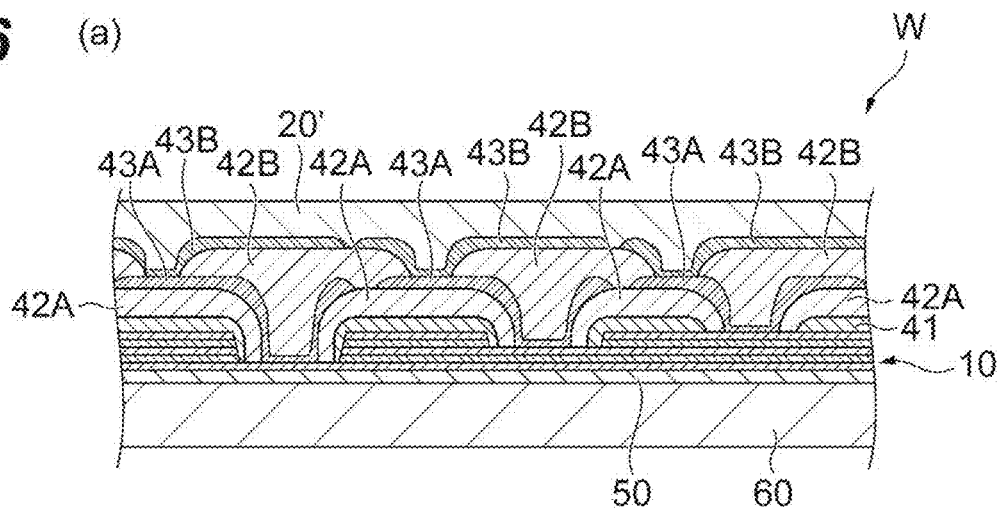
(a)
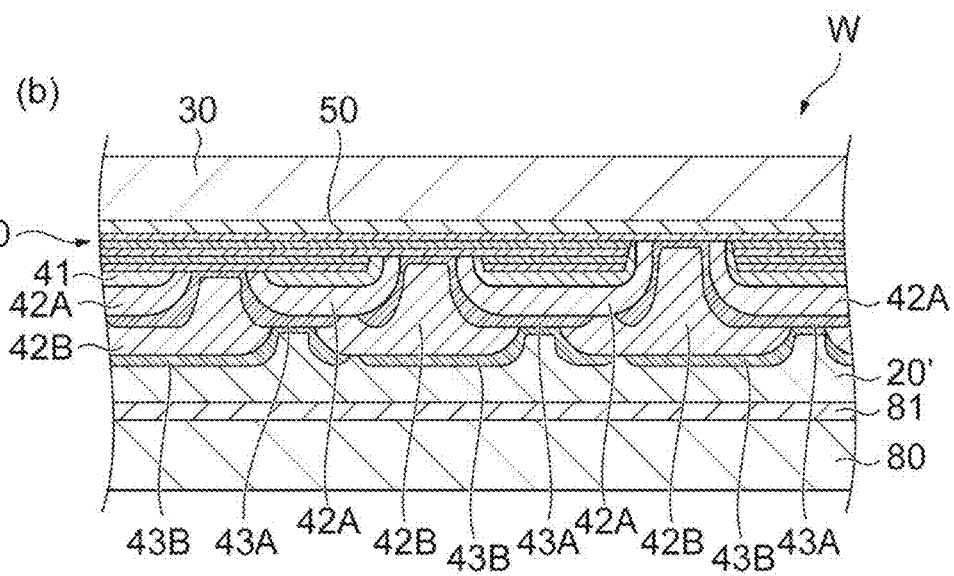
(b)
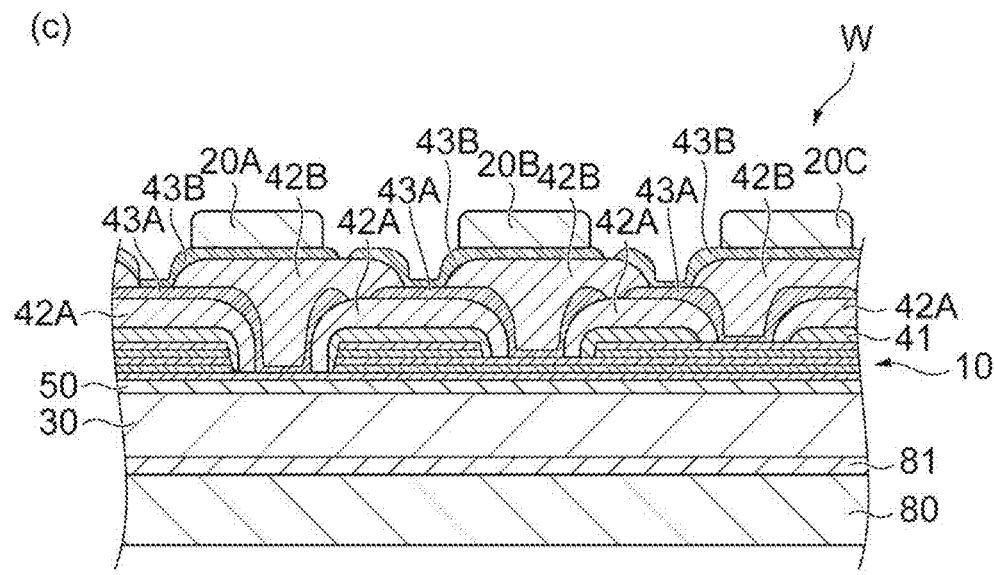
(c)

THIN-FILM CAPACITOR AND METHOD FOR MANUFACTURING THIN-FILM CAPACITOR

TECHNICAL FIELD

The present invention relates to a thin-film capacitor and a method for manufacturing a thin-film capacitor.

BACKGROUND ART

In accordance with miniaturization of electronic devices, there is demand for miniaturization including reduction in length and high functionality in electronic components used in electronic devices. For example, Patent Literature 1 discloses a thin-film capacitor including a substrate that has an organic film, a resin film formed on the organic film, and an uneven portion formed on a surface of the resin film; and a capacitor element that is provided on the substrate. The capacitor element has a lower surface electrode film, a dielectric thin film, and an upper surface electrode film which are laminated by a vapor growth method.

In addition, Patent Literature 2 discloses a thin-film capacitor including a substrate, a capacitor portion that has an electrode layer and a dielectric thin film and is formed on the substrate, a protective layer that is formed to cover the capacitor portion, and a leading conductor that is connected to the electrode layer.

CITATION LIST

Patent Literature

Patent Literature 1: Japanese Unexamined Patent Publication No. 2007-280998
Patent Literature 2: Japanese Unexamined Patent Publication No. 2007-81325

SUMMARY OF INVENTION

Technical Problem

The thin-film capacitors described above are thinned by forming a dielectric thin film using a vapor growth method. However, the relative dielectric constant of a dielectric thin film formed in this manner is approximately 50, for example. In order to increase the capacitance of a thin-film capacitor, there is demand for further improvement of the relative dielectric constant. In addition, if a thin-film capacitor is reduced in length, warpage is likely to occur in the thin-film capacitor due to stress or the like. As a result, there is a possibility of damage to the thin-film capacitor.

The present invention has been made in consideration of the foregoing circumstances, and an object thereof is to provide a thin-film capacitor in which high functionality is achieved while reduction in length is realized.

Solution to Problem

In order to solve the foregoing problems, according to an embodiment of the present invention, there is provided a thin-film capacitor including an insulating base member, and a capacitance portion that is laminated on the insulating base member and has a plurality of internal electrode layers which are provided in a lamination direction and dielectric layers which are sandwiched between the internal electrode layers. A relative dielectric constant of the dielectric layers is 100 or higher.

In this thin-film capacitor, the capacitance portion is laminated on the insulating base member. Due to such a configuration, compared to substrates used in general thin-film capacitors, the capacitance portion can be supported while being reduced in thickness. Accordingly, the thin-film capacitor can be reduced in length. In addition, in this thin-film capacitor, the relative dielectric constant of the dielectric layers is 100 or higher, and the relative dielectric constant is improved compared to dielectric layers used in general film capacitors and the like. Accordingly, the thin-film capacitor is increased in capacitance. Therefore, high functionality of the thin-film capacitor can be achieved while reduction in length is realized.

In the thin-film capacitor according to the embodiment, a modulus of elasticity of the insulating base member may be within a range of 5 GPa to 25 GPa. In this case, a rigidity of the insulating base member can be enhanced. Accordingly, damage to the thin-film capacitor due to an external force or the like can be curbed.

In the thin-film capacitor according to the embodiment, the dielectric layers may be baked. In this case, the relative dielectric constant of the dielectric layers can be improved through baking. Accordingly, the thin-film capacitor can be increased in capacitance.

According to another embodiment of the present invention, there is provided a method for manufacturing a thin-film capacitor including a laminating step of laminating a plurality of internal electrode layers and dielectric films sandwiched between the internal electrode layers on a support member and forming a laminate, a baking step of baking the laminate and forming dielectric layers from the dielectric films, a removing step of removing the support member from the laminate after the baking step, and an insulating base member-forming step of forming an insulating base member on a surface of the laminate exposed through the removing step.

This method for manufacturing a thin-film capacitor includes the baking step of baking a laminate including dielectric films. In this manner, the relative dielectric constant of the dielectric layers can be improved by baking dielectric films and forming dielectric layers. In addition, in this method for manufacturing a thin-film capacitor, in the baking step, a support member is used, and the support member is removed after the baking step, thereby forming the insulating base member supporting the capacitance portion. Accordingly, in the baking step, a material which can withstand the temperature during baking is used for a support member, and after the baking step, the insulating base member can be formed of a material more suitable for being reduced in length. Accordingly, the thin-film capacitor is increased in capacitance. Therefore, high functionality of the thin-film capacitor can be achieved while reduction in length is realized.

In the method for manufacturing a thin-film capacitor according to the embodiment, in the laminating step, a protective layer may be provided between the support member and the internal electrode layer positioned closest to the support member side. Due to the protective layer provided in this manner, the internal electrode layers can be protected when the support member is removed. Accordingly, damage to the internal electrode layer positioned closest to the support member side can be curbed.

According to another embodiment of the present invention, there is provided a thin-film capacitor including a capacitance portion that has a plurality of internal electrode layers and dielectric layers sandwiched between the internal electrode layers, and a wiring portion that is laminated on the capacitance portion and has an insulating layer covering a wiring layer and the capacitance portion electrically connected to the internal electrode layers. A coefficient of thermal expansion of the insulating layer is higher than a coefficient of thermal expansion of the wiring layer and a coefficient of thermal expansion of the capacitance portion. A thickness of the wiring layer is larger than a thickness of the capacitance portion.

In this thin-film capacitor, the coefficient of thermal expansion of the insulating layer is higher than the coefficient of thermal expansion of the wiring layer and the coefficient of thermal expansion of the capacitance portion, and the thickness of the wiring layer is larger than the thickness of the capacitance portion. In ordinary thin-film capacitors, since the coefficient of thermal expansion of the insulating layer is larger than the coefficient of thermal expansion of the capacitance portion, warpage is likely to occur due to a deviation in coefficient of thermal expansion between the wiring portion and the capacitance portion. In contrast, when the thickness of the wiring layer included in the wiring portion is larger than the thickness of the capacitance portion, the average coefficient of thermal expansion of the wiring portion can be decreased. As a result, a deviation in coefficient of thermal expansion between the wiring portion and the capacitance portion is alleviated. Accordingly, warpage derived from the difference between the coefficients of thermal expansion can be curbed. Therefore, warpage of the thin-film capacitor can be reduced while reduction in length is realized, so that high functionality of the thin-film capacitor can be achieved.

In the thin-film capacitor according to the embodiment, the thickness of the wiring layer may be within a range of 40% to 70% of a thickness of the wiring portion. In this case, the ratio of the wiring layer having a relatively low coefficient of thermal expansion to the insulating layer having a relatively high coefficient of thermal expansion can be raised. Accordingly, the average coefficient of thermal expansion of the wiring portion can be decreased. As a result, a deviation in coefficient of thermal expansion between the wiring portion and the capacitance portion is alleviated. Accordingly, warpage of the thin-film capacitor can be reduced while reduction in length is realized.

According to another embodiment of the present invention, there is provided a thin-film capacitor including an insulating base member, a capacitance portion that is laminated on the insulating base member and has a plurality of internal electrode layers which are provided in a lamination direction and dielectric layers which are sandwiched between the internal electrode layers, and a wiring portion that is laminated on the capacitance portion and has an insulating layer covering a wiring layer and the capacitance portion electrically connected to the internal electrode layers. A difference between a coefficient of thermal expansion of the insulating layer and a coefficient of thermal expansion of the insulating base member is within a range of −10 to +50.

According to the thin-film capacitor, the capacitance portion is laminated on the insulating base member. Due to such a configuration, compared to substrates used in general thin-film capacitors, the capacitance portion can be supported while being reduced in thickness. Accordingly, the thin-film capacitor can be reduced in length. In addition, according to the thin-film capacitor, the difference between the coefficient of thermal expansion of the insulating layer and the coefficient of thermal expansion of the insulating base member is within a range of −10 to +50. In ordinary thin-film capacitors, warpage is likely to occur due to a deviation in coefficient of thermal expansion between a capacitance portion and a base member. In contrast, when the foregoing relationship is set between the coefficients of thermal expansion of the insulating layer of the wiring portion provided with the capacitance portion sandwiched therebetween and the insulating base member, a deviation in coefficient of thermal expansion on both sides with the capacitance portion sandwiched therebetween is alleviated. Accordingly, regardless of the coefficient of thermal expansion of the capacitance portion, warpage of the thin-film capacitor can be reduced while reduction in length is realized, so that high functionality of the thin-film capacitor can be achieved.

In the thin-film capacitor according to the embodiment, the insulating layer and the insulating base member may be formed of the same material. Due to such a form, the difference between the coefficients of thermal expansion of the insulating base member and the insulating layer can be zero. Accordingly, warpage of the thin-film capacitor can be further reduced.

Advantageous Effects of Invention

According to the present invention, a thin-film capacitor, in which high functionality is achieved while reduction in length is realized, and a method for manufacturing a thin-film capacitor are provided.

BRIEF DESCRIPTION OF DRAWINGS

FIGS. 6(a), 6(b), and 6(c) are views for describing a modification example of the method for manufacturing the thin-film capacitor illustrated in FIG. 1.

DESCRIPTION OF EMBODIMENTS

Hereinafter, with reference to the drawings, various embodiments will be described detail. In each of the drawings, the same reference signs are applied to parts which are the same or corresponding, and duplicated description will be omitted.

First Embodiment

Figure 1:
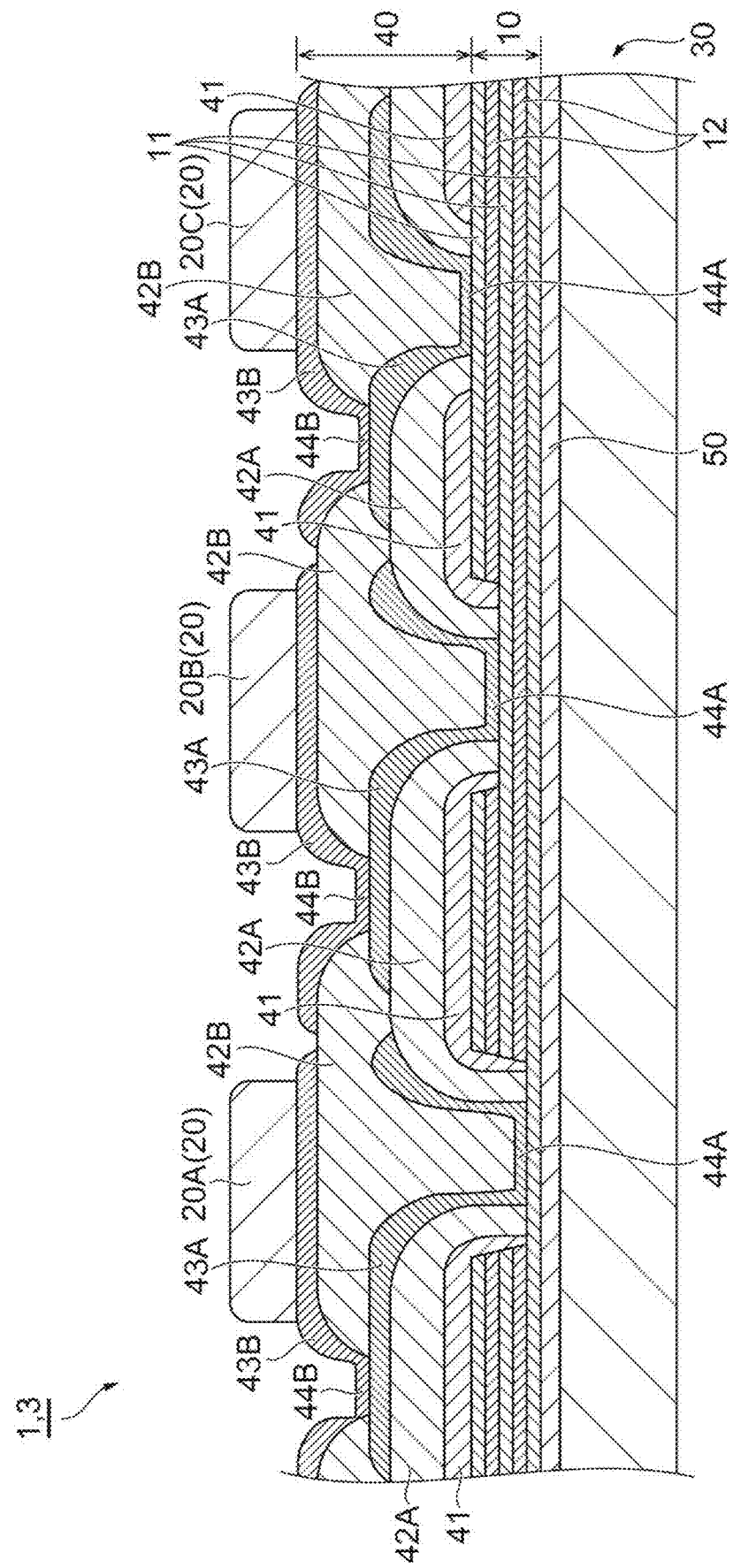
FIG. 1 is a cross-sectional view schematically illustrating a part of a thin-film capacitor according to a first embodiment and a third embodiment of the present invention.
Figure 2:
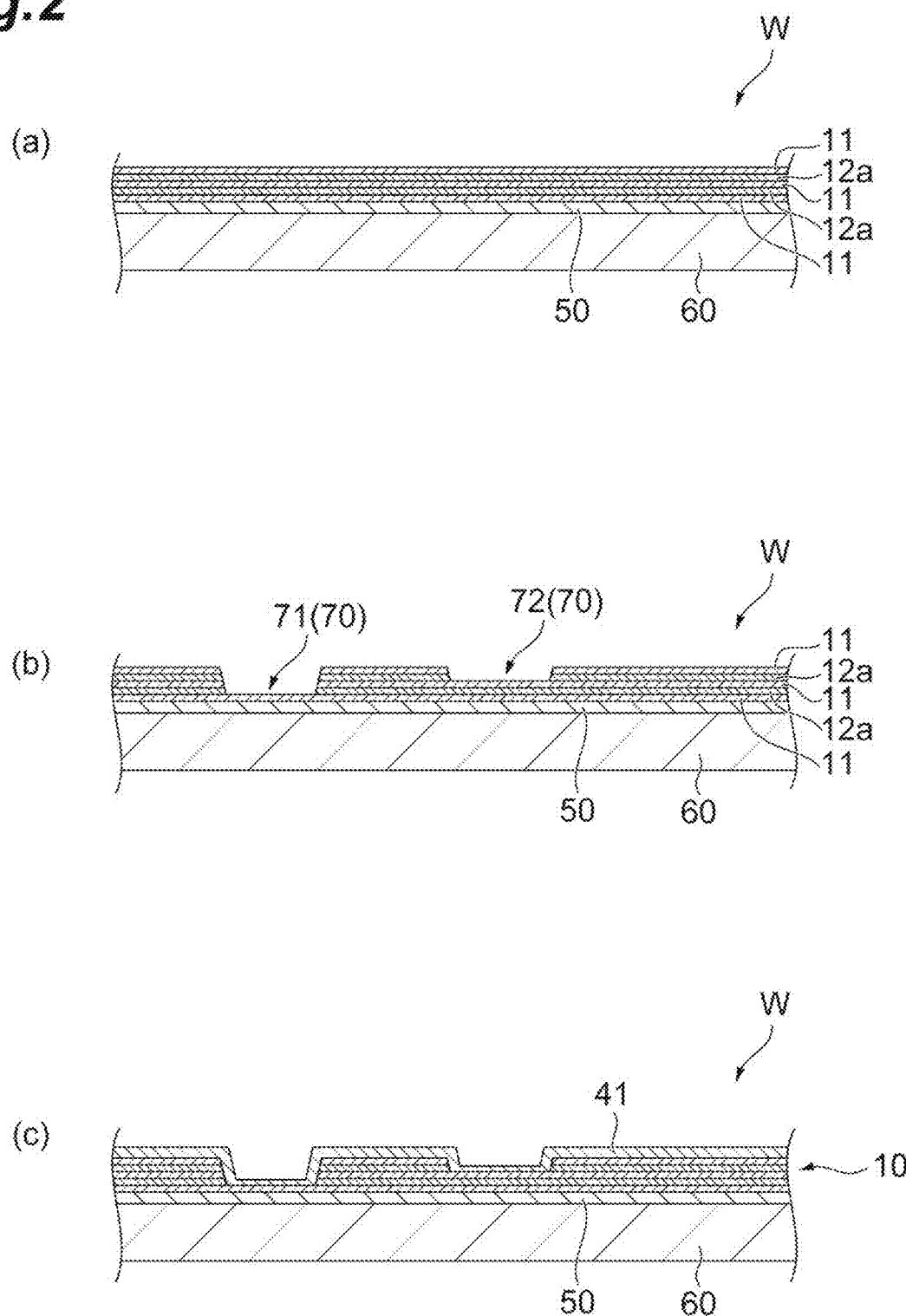
FIGS. 2(a), 2(b), and 2(c) are views for describing a method for manufacturing the thin-film capacitor illustrated in FIG. 1.
Figure 3:
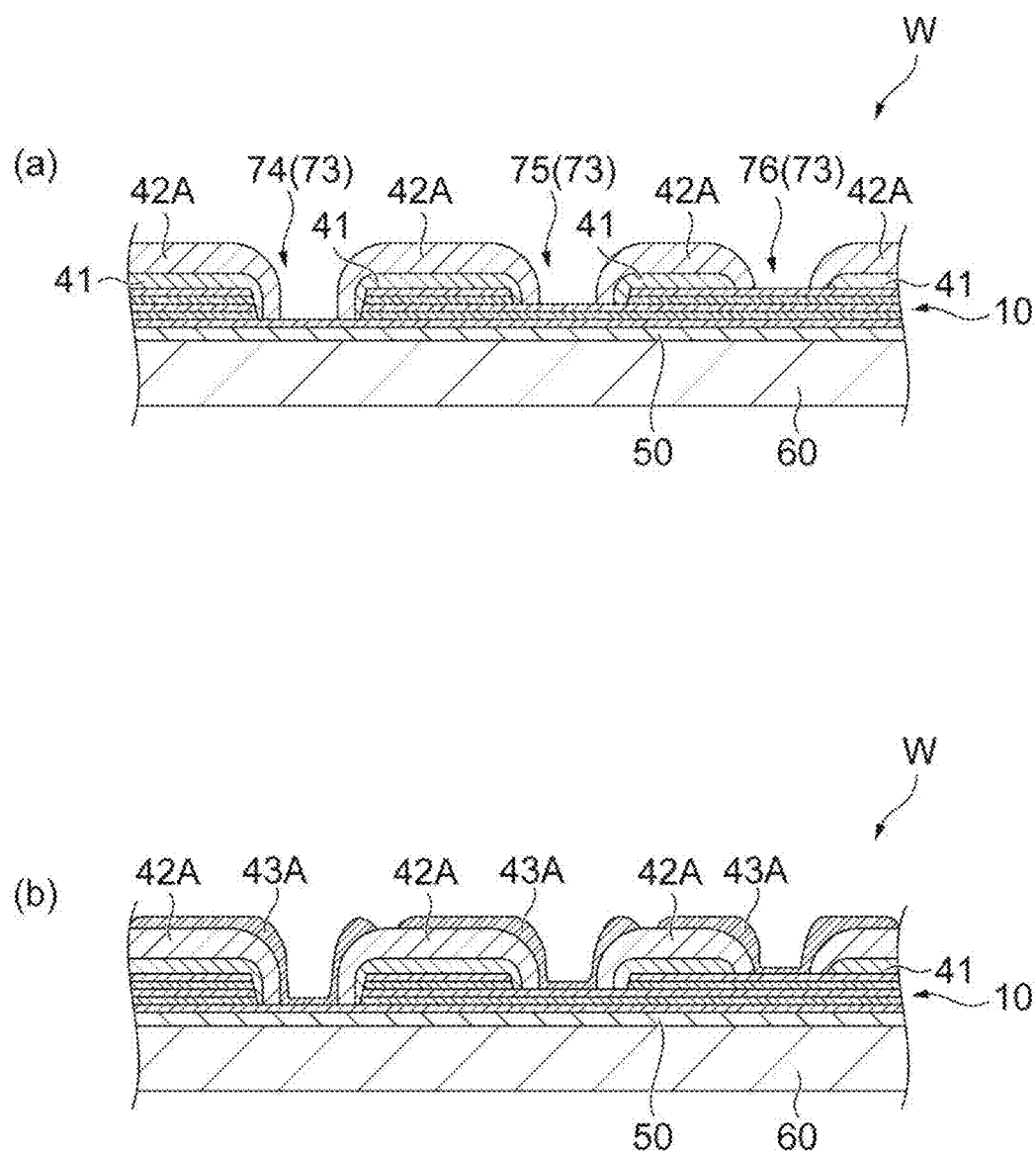
FIGS. 3(a) and 3(b) are views for describing the method for manufacturing the thin-film capacitor illustrated in FIG. 1.
Figure 4:
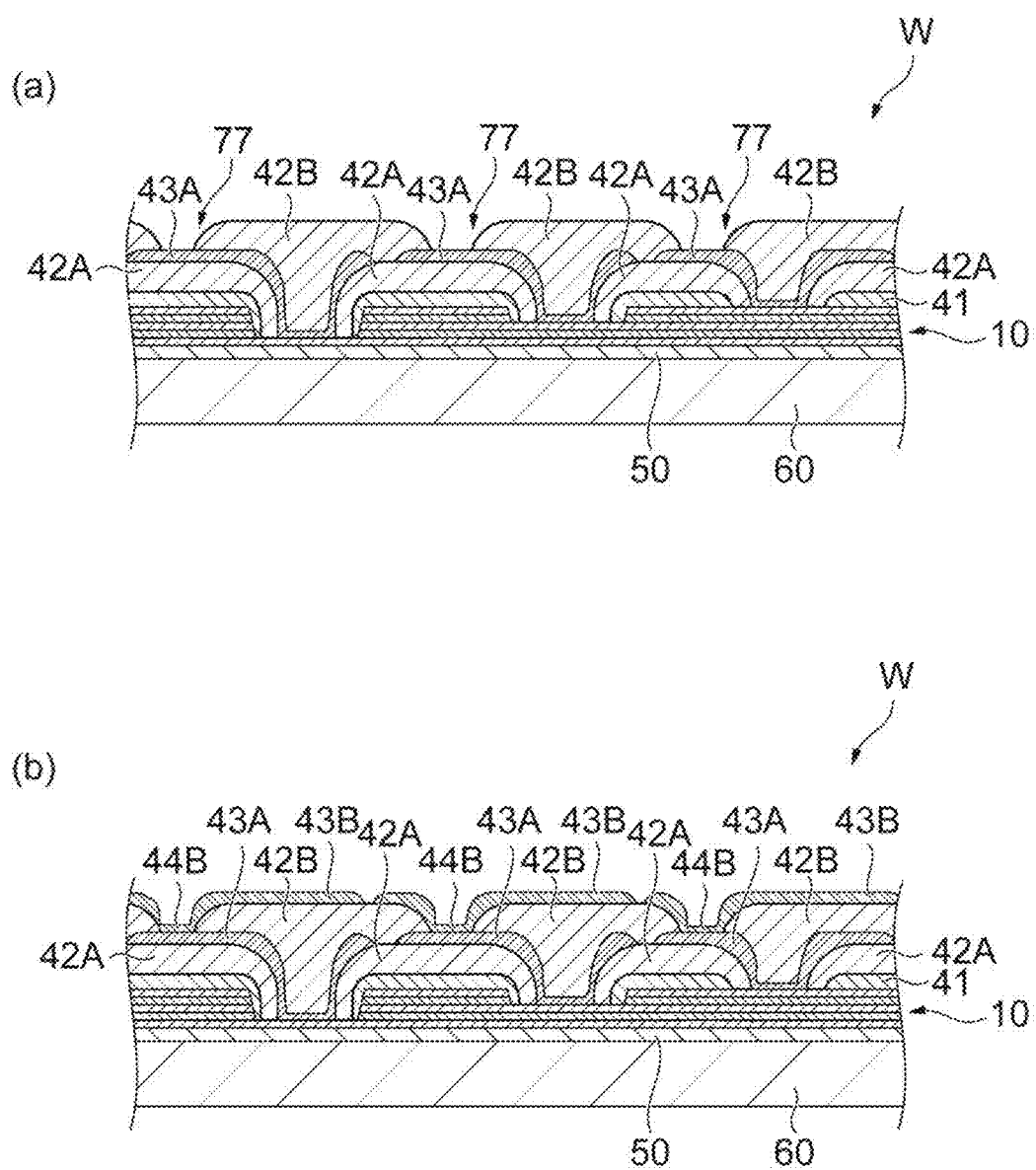
FIGS. 4(a) and 4(b) are views for describing the method for manufacturing the thin-film capacitor illustrated in FIG. 1.
Figure 5:
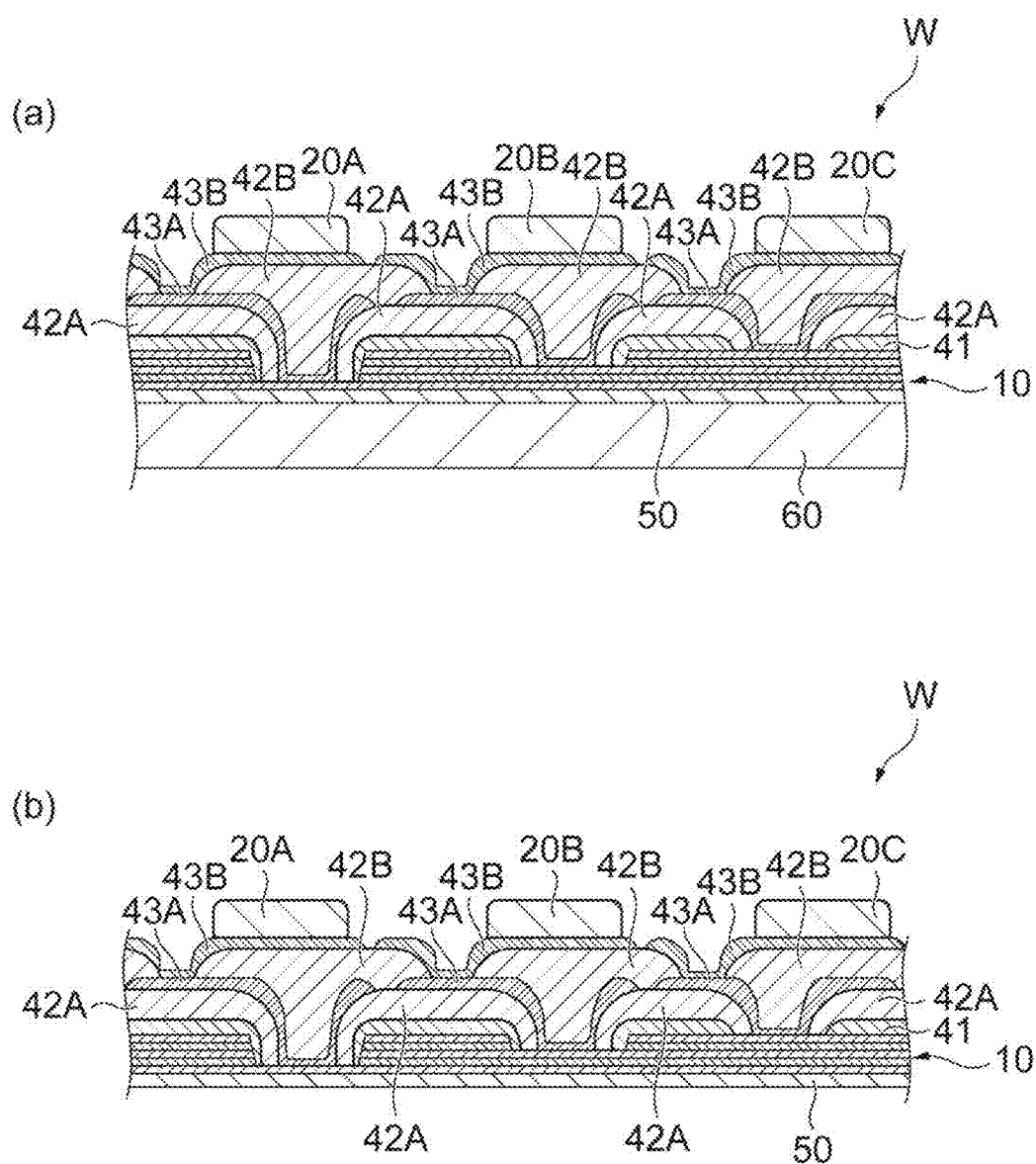
FIGS. 5(a) and 5(b) are views for describing the method for manufacturing the thin-film capacitor illustrated in FIG. 1.

FIG. 1 is a cross-sectional view schematically illustrating a part of a thin-film capacitor according to a first embodiment of the present invention. As illustrated in FIG. 1, a thin-film capacitor 1 internally has a capacitance portion 10 as a capacitor structure and has electrode terminals 20 (20A, 20B, and 20C) as electrode terminals drawn out from the capacitance portion 10. The capacitance portion 10 and the electrode terminals 20 are laminated on an insulating base member 30. A wiring portion 40 electrically connecting the capacitance portion 10 and the electrode terminals 20 to each other is provided between the capacitance portion 10 and the electrode terminals 20. In addition, the thin-film capacitor 1 includes a protective layer 50 between the capacitance portion 10 and the insulating base member 30.

In this specification, "a lamination direction" is a direction in which layers sequentially overlap from the insulating base member 30 toward the electrode terminals 20 in the order of the insulating base member 30, the protective layer 50, the capacitance portion 10, the wiring portion 40, and the electrode terminals 20. In addition, in the following description, the electrode terminal 20 side in the lamination direction may be described as "an upper side", and the insulating base member 30 side in the lamination direction may be described as "a lower side".

The capacitance portion 10 has a plurality of internal electrode layers 11 which are provided in the lamination direction and dielectric layers 12 sandwiched between the internal electrode layers 11. The internal electrode layers 11 and the dielectric layers 12 are alternately laminated. In the present embodiment, the capacitance portion 10 has a multi-layer structure including three internal electrode layers 11 and two dielectric layers 12. The capacitance portion 10 has a plurality of regions in which the internal electrode layers 11 and the dielectric layers 12 are partially removed. In these regions in which the internal electrode layers 11 and the dielectric layers 12 are partially removed, each of the internal electrode layers 11 is connected to first wiring layers 43A, which will be described below. According to such a configuration, a multi-layer capacitor structure is formed in the capacitance portion 10.

The internal electrode layer 11 is formed of a material having conductivity. Specifically, a material containing nickel (Ni) or platinum (Pt) as a main component is favorably used for the internal electrode layer 11. Particularly, Ni is favorably used. When a material containing Ni as a main component is used for the internal electrode layer 11, it is preferable that the amount thereof be 50 mass % or more with respect to the internal electrode layer 11 in its entirety. That is, the term "a main component" indicates that the ratio of the corresponding component to the entirety is 50 mass % or more. In addition, when the main component of the internal electrode layer 11 is Ni, at least one selected from the group consisting of platinum (Pt), palladium (Pd), iridium (Ir), rhodium (Rh), ruthenium (Ru), osmium (Os), rhenium (Re), tungsten (W), chromium (Cr), tantalum (Ta), and silver (Ag) (which will hereinafter be referred to as "an additive element") is also contained. When the internal electrode layer 11 contains an additive element, interruption of the internal electrode layer 11 can be curbed. The internal electrode layer 11 may contain a plurality of additive elements. For example, the thickness of the internal electrode layer 11 is within a range of approximately 10 nm to 1,000 nm.

The dielectric layer 12 is formed of a Perovskite-based dielectric material. Regarding a Perovskite-based dielectric material in the present embodiment, the dielectric layer 12 is formed of a dielectric (ferroelectric) material having a Perovskite structure including $BaTiO_3$ (barium titanate), $(Ba_{1-X}Sr_X)TiO_3$ (barium strontium titanate), $(Ba_{1-X}Ca_X)TiO_3$, $PbTiO_3$, $Pb(Zr_XTi_{1-X})O_3$ or the like; a composite Perovskite relaxer-type ferroelectric material represented by $Pb(Mg_{1/3}Nb_{2/3})O_3$ and the like; a bismuth layered compound represented by $Bi_4Ti_3O_{12}$, $SrBi_2Ta_2O_9$ and the like; a tungsten-bronze-type ferroelectric material represented by $(Sr_{1-X}Ba_X)Nb_2O_6$, $PbNb_2O_6$, and the like; or the like. Here, in a Perovskite structure, a Perovskite relaxer-type ferroelectric material, a bismuth layered compound, and a tungsten-bronze-type ferroelectric material, the ratio of the number of B sites to A sites is an ordinary integer ratio. However, for the sake of improvement of characteristics, the ratio may be caused to intentionally deviate from an integer ratio. For the sake of controlling characteristics of the dielectric layers 12, the dielectric layers 12 may suitably contain an additive substance as a sub-component. The dielectric layers 12 are baked, and the relative dielectric constant ($\varepsilon_r$) thereof is 100 or higher, for example. The higher the relative dielectric constant of the dielectric layers 12, the more preferable, and the upper limit thereof is not particularly limited. For example, the thickness of the dielectric layer 12 is within a range of 10 nm to 1,000 nm.

The electrode terminals 20 are terminals for electrically connecting the thin-film capacitor 1 and an external electronic component or the like (not illustrated) to each other. The electrode terminals 20 are laminated on the wiring portion 40, which will be described below. In the present embodiment, the thin-film capacitor 1 includes a plurality of electrode terminals 20. FIG. 1 illustrates only three electrode terminals 20A, 20B, and 20C.

Regarding a material forming the electrode terminal 20, it is preferable to use a material of which the main component is nickel (Ni), copper (Cu), gold (Au), platinum (Pt), or an alloy containing these metals. Particularly, an alloy containing Cu as a main component is favorably used. The higher the purity of Cu forming the electrode terminal 20, the more preferable. It is preferable that the purity be 99.99 mass % or more. A very small amount of impurities may be included in the electrode terminal 20. Examples of impurities which may be included in the electrode terminal 20 formed of an alloy containing Cu as a main component include migrating metal elements and rare earth elements such as iron (Fe), titanium (Ti), nickel (Ni), aluminum (Al), magnesium (Mg), manganese (Mn), silicon (Si) or chromium (Cr), vanadium (V), zinc (Zn), niobium (Nb), tantalum (Ta) yttrium (Y), lanthanum (La), and cesium (Ce); chlorine (Cl); sulfur (S); and phosphorus (P).

The insulating base member 30 has a function of supporting the capacitance portion 10. For example, the insulating base member 30 is for lied of a material having insulating properties, such as an organic film or glass ($SiO_2$). A material forming the insulating base member 30 need only have insulating properties and is not particularly limited. However, it is preferable that the material have a certain degree of rigidity. The modulus of elasticity thereof can be within a range of 5 GPa to 25 GPa. For example, when an organic film is used as the insulating base member 30, it is preferable that the organic film contain a filler, glass cloth, or the like. For example, the thickness of the insulating base member 30 can be within a range of 5 µm to 20 µm.

The wiring portion 40 is provided to cover a region in which the capacitance portion 10 is formed. The wiring portion 40 includes passivation layers 41, first insulating layers 42A, second insulating layers 42B, the first wiring layers 43A, and second wiring layers 43B.

The passivation layers 41 directly cover the capacitance portion 10 and are formed of an inorganic insulating material such as glass ($SiO_2$), for example. However, the passivation layers 41 do not have to be provided. For example, the thickness of the passivation layer 41 may be within a range of approximately 0.5 µm to 5 µm.

The first insulating layers 42A cover the capacitance portion 10 in regions in which a capacitor is constituted in the capacitance portion 10. The second insulating layers 42B cover regions in which no first insulating layer 42A is formed and partially cover peripheral edges of the first insulating layers 42A. That is, the capacitance portion 10 is covered due to a two-stage structure including the first insulating layers 42A and the second insulating layers 42B.

The first insulating layers 42A and the second insulating layers 42B need only be formed of a material having insulating properties and are not particularly limited. However, for example, it is possible to use a non-conductive resin such as polyimide; an inorganic material such as glass ($SiO_2$), alumina ($Al_2O_3$), or silicon nitride (SiN); or an insulating material in which these are mixed or laminated. For example, the thickness of the first insulating layer 42A is within a range of 0.5 µm to 10 µm. For example, the thickness of the second insulating layer 42B is within a range of 0.5 µm to 10 µm. Here, "a thickness of the first insulating layer 42A" indicates a distance between the upper surface of the passivation layer 41 and the upper surface of the first insulating layer 42A. In addition, "a thickness of the second insulating layer 42B" indicates a distance between the upper surface of the first insulating layer 42A and the upper surface of the second insulating layer 42B.

The first wiring layer 43A is formed between the first insulating layer 42A and the second insulating layer 42B along the upper surface of the first insulating layer 42A. The first wiring layer 43A has a contact portion 44A which extends in an up-down direction along the upper surface of the first insulating layer 42A and of which the lower end is in contact with the internal electrode layer 11. In addition, the second wiring layer 43B is formed on the second insulating layer 42B along the upper surface of the second insulating layer 42B. The second wiring layer 43B has a contact portion 44B which extends in the up-down direction along the second insulating layer 42B and of which the lower end is in contact with the first wiring layer 43A. The electrode terminals 20A, 20B, and 20C are formed on the second wiring layers 43B.

The contact portion 44B of the second wiring layer 43B, in which the electrode terminal 20A is formed, is in contact with the first wiring layer 43A having the contact portion 44A in contact with the internal electrode layer 11, of the three internal electrode layers 11, positioned closest to the insulating base member 30 side. The contact portion 44B of the second wiring layer 43B in which the electrode terminal 20B is formed is in contact with the first wiring layer 43A having the contact portion 44A in contact with the internal electrode layer 11 positioned in the middle of the three internal electrode layers 11. The contact portion 44B of the second wiring layer 43B in which the electrode terminal 20C is formed is in contact with the first wiring layer 43A having the contact portion 44A in contact with the internal electrode layer 11, of the three internal electrode layers 11, positioned closest to the electrode terminal 20 side. In this manner, each of the electrode terminals 20A, 20B, and 20C is electrically connected to one of the internal electrode layers 11 via the second wiring layer 43B and the first wiring layer 43A.

The protective layer 50 is provided between the capacitance portion 10 and the insulating base member 30. For example, the protective layer 50 is forming of the same material as the dielectric layer 12 but may be formed of a different material (for example, alumina or silicon nitride). It is preferable that the protective layer 50 be provided to have a thickness slightly larger than the thickness of the dielectric layer 12. For example, it can be within a range of 10 nm to 1,000 nm.

Next, with reference to FIGS. 2 to 5, a method for manufacturing the thin-film capacitor 1 will be described. FIGS. 2 to 5 are views for describing the method for manufacturing the thin-film capacitor illustrated in FIG. 1. FIGS. 2 to 5 illustrate enlarged parts of the thin-film capacitor 1 in a stage in the middle of manufacturing. Actually, a plurality of thin-film capacitors 1 are formed at one time. Thereafter, they are divided into individual pieces of the thin-film capacitor 1.

First, as illustrated in FIG. 2(a), a support member 60 is prepared, and the protective layer 50 is laminated on the support member 60. Thereafter, the internal electrode layers 11 and dielectric films 12a serving as the dielectric layers 12 are alternately laminated on the protective layer 50, thereby forming a laminate W (laminating step). Through this step, the protective layer 50 is in a state of being provided between the support member 60 and the internal electrode layer 11, of the three internal electrode layers 11, positioned closest to the support member 60 side. In addition, due to the internal electrode layers 11 and the dielectric films 12a which are alternately laminated, a part serving as the capacitance portion 10 is formed. For example, Examples of a method for forming the internal electrode layer 11 include DC sputtering. In addition, regarding methods for forming the protective layer 50 and the dielectric films 12a, a deposition technology such as a solution method, a physical vapor deposition (PVD) method such as sputtering, or a chemical vapor deposition (CVD) method can be used. However, a sputtering method is a more preferable method. For example, nickel (Ni), silicon (Si), or the like can be used as a material of the support member 60. A material of the support member 60 need only be a material which can withstand the temperature during baking in a baking step (which will be described below) and is not particularly limited.

Next, as illustrated in FIG. 2(b), predetermined openings 70 penetrating the internal electrode layers 11 and the dielectric films 12a are formed. For example, the openings 70 are formed through dry etching using a patterned resist as a mask. Through this step, two openings 71 and 72 are formed in the internal electrode layers 11 and the dielectric films 12a. In the opening 71, the internal electrode layer 11, of the three internal electrode layers 11, positioned closest to the support member 60 side is exposed to a bottom surface, and a continuous side surface is formed by end surfaces of the remaining internal electrode layers 11 and the dielectric films 12a. In addition, in the opening 72, the internal electrode layer 11 positioned in the middle of the three internal electrode layers 11 is exposed to the bottom surface, and a continuous side surface is formed by end surfaces of the internal electrode layer 11 positioned on the uppermost side of the three internal electrode layers 11 and the dielectric film 12a on the upper side.

Thereafter, the laminate W is baked (baking step). Through this step, the dielectric films 12a are sintered, so that the dielectric layers 12 having a relative dielectric constant of 100 or higher are formed, and the capacitance portion 10 (refer to FIG. 2(c)) is formed. It is preferable that the temperature during baking be a temperature at which the dielectric films 12a are sintered (crystallized). Specifically, it is preferable that the temperature be within a range of approximately 800° C. to 1,000° C. In addition, the baking time can be within a range of approximately 5 minutes to 2 hours. The atmosphere during baking is not particularly limited, and any one of an oxidizing atmosphere, a reducing atmosphere, and a neutral atmosphere may be adopted. However, it is preferable that baking be performed under at least an oxygen partial pressure to an extent that the internal electrode layers 11 are not oxidized. The timing of baking is not limited. For example, baking may be performed before the openings 70 are formed.

Next, as illustrated in FIG. 2(c), the passivation layers 41 are formed. Accordingly, the upper surface of the laminate W and the bottom surfaces and the side surfaces of the openings 70 are in a state of being covered with the passivation layers 41. For example, the passivation layers 41 can be formed by a PVD method such as sputtering.

Next, as illustrated in FIG. 3(a), the passivation layers 41 formed on the bottom surfaces of the openings 70 (refer to FIG. 2(b)) are removed, and the first insulating layers 42A are formed such that the passivation layers 41 are covered. For example, the first insulating layers 42A are formed by applying a thermosetting resin in an uncured state, and heating and curing the applied resin thereafter. In addition, the first insulating layers 42A may be formed by applying a photo-curing resin in an uncured state, and irradiating the applied resin with light having a particular wavelength such that the resin is cured. In addition, the first insulating layers 42A may be formed by using a different method such as sputtering. After the first insulating layers 42A are formed, openings 73 for providing the first wiring layers 43A through dry etching or the like are formed. In the present embodiment, three openings 74, 75, and 76 are forming as the openings 73. The opening 74 is formed near the center of the opening 71 such that the first insulating layer 42A inside the opening 71 is penetrated. In addition, the opening 75 is formed near the center inside the opening 72 such that the first insulating layer 42A inside the opening 72 is penetrated. Moreover, the opening 76 is formed to penetrate the first insulating layer 42A in a predetermined region. Through this step, the internal electrode layer 11 positioned on the lowermost side of the three internal electrode layers 11 is in a state of being exposed to the bottom surface of the opening 74. The internal electrode layer 11 positioned in the middle of the three internal electrode layers 11 is in a state of being exposed to the bottom surface of the opening 75. The internal electrode layer 11 positioned on the uppermost side of the three internal electrode layers 11 is in a state of being exposed to the bottom surface of the opening 76.

Next, as illustrated in FIG. 3(b), the first wiring layers 43A are formed inside the openings 73 of the first insulating layers 42A and on the first insulating layers 42A at the peripheral edges of the openings 73. For example, the first wiring layers 43A are formed by performing patterning through etching after a conductive material such as copper (Cu) is subjected to sputtering or vapor deposition. Through this step, a plurality of first wiring layers 43A electrically independent from each other are formed. At this time, the first wiring layer 43A formed around the opening 74 is in a state of being electrically connected to the internal electrode layer 11 on the lowermost side of the three internal electrode layers 11. The first wiring layer 43A formed around the opening 75 is in a state of being electrically connected to the internal electrode layer 11 positioned in the middle of the three internal electrode layers 11. The first wiring layer 43A formed around the opening 76 is in a state of being electrically connected to the internal electrode layer 11 on the uppermost side of the three internal electrode layers 11.

Next, as illustrated in FIG. 4(a), the second insulating layers 42B are formed on the first insulating layers 42A and on the first wiring layers 43A. Similar to the first insulating layers 42A, for example, the second insulating layers 42B are formed by a method in which a thermosetting resin in an uncured state is applied and the applied resin is heated and cured thereafter. After the second insulating layers 42B are formed, three openings 77 for forming the second wiring layers 43B through dry etching or the like are formed. Through this step, the first wiring layers 43A are in a state of being exposed to the openings 77 respectively.

Next, as illustrated in FIG. 4(b), the second wiring layers 43B are formed inside the openings 77 of the second insulating layers 42B and on the second insulating layers 42B at the peripheral edges of the openings 77. Similar to the first wiring layers 43A, for example, the second wiring layers 43B are formed by performing patterning through etching after a conductive material such as copper (Cu) is subjected to sputtering or vapor deposition. Through this step, a plurality of second wiring layers 43B electrically independent from each other are formed. At this time, the second wiring layers 43B formed around the openings 77 are electrically connected to the first wiring layers 43A respectively, thereby forming the wiring portion 40.

Next, as illustrated in FIG. 5(a), the electrode terminals 20A, 20B, and 20C for electrically connecting the thin-film capacitor 1 to an external electronic component are formed on the second wiring layers 43B. For example, the electrode terminals 20A, 20B, and 20C are formed by performing etching or the like after a layer of a conductive material such as copper (Cu) is formed through plating or the like.

Next, as illustrated in FIG. 5(b), the support member 60 is removed from the laminate W (removing step). For example, the support member 60 is removed through etching or the like. Through this step, the protective layer 50 is in a state of being exposed to the side below the laminate W. Thereafter, the insulating base member 30 supporting the capacitance portion 10 is formed on the surface of the laminate W exposed through the removing step, that is, the surface of the protective layer 50 (a surface on a side opposite to the side on which the capacitance portion 10 is laminated, and a surface illustrated on the lower side in FIG. 5(b)) exposed to the side below the laminate W (insulating base member-forming step). For example, the insulating base member 30 can be formed by a laminating method or the like. In addition, the insulating base member 30 may be formed by applying a liquid resin or the like using a method such as spin coating. Lastly, the laminate W is divided into individual pieces through dicing or the like, thereby obtaining the thin-film capacitor 1 illustrated in FIG. 1.

Next, with reference to FIG. 6, a modification example of the method for manufacturing the thin-film capacitor 1 will be described. FIG. 6 is view for describing the modification example of the method for manufacturing the thin-film capacitor illustrated in FIG. 1.

In the method for manufacturing the thin-film capacitor 1 according to the modification example, the procedure is similar to that of the manufacturing method described above to the step illustrated in FIG. 4(b), and the protective layer 50, the capacitance portion 10, and the wiring portion 40 are formed on the support member 60. Thereafter, as illustrated in FIG. 6(a), a conductive material layer 20' serving as the electrode terminal 20 for electrically connecting the thin-film capacitor 1 to an external electronic component is formed on the second wiring layers 43B. For example, the conductive material layer 20' is formed by performing plating of copper (Cu) or the like.

Next, a new support member 80 having an adhesion layer 81 is prepared. Thereafter, as illustrated in FIG. 6(b), the laminate W is turned upside down such that the conductive material layer 20' is placed on the lower side. Then, the laminate W is attached to the support member 80 with the adhesion layer 81 interposed therebetween. For example, the support member 80 is formed of silicon (Si). Next, the support member 60 is removed through etching or the like, thereby forming the insulating base member 30 on the exposed surface of the laminate W. For example, the insulating base member 30 may be formed by a laminating method or may be formed by applying a liquid resin through spin coating or the like.

Next, as illustrated in FIG. 6(c), the laminate W is turned upside down again such that the conductive material layer 20' is placed on the upper side (that is, the insulating base member 30 is placed on the lower side). Then, the laminate W is attached to the support member 80 again. Accordingly, the conductive material layer 20' is in a state of being exposed. Thereafter, etching or the like is performed, thereby forming the electrode terminals 20A, 20B, and 20C from the conductive material layer 20'. Lastly, the support member 80 is removed, and the electrode terminals 20A, 20B, and 20C are divided into individual pieces through dicing or the like, thereby obtaining the thin-film capacitor 1 illustrated in FIG. 1.

As described above, in the thin-film capacitor 1 according to the present embodiment, the capacitance portion 10 is laminated on the insulating base member 30. In ordinary thin-film capacitors, for example, a capacitance portion is laminated on a substrate formed of silicon (Si), nickel (Ni), or the like. However, it is difficult to further reduce the thickness (for example, smaller than 20 µm) of a substrate formed of these materials. Particularly, there is a possibility of damage such as cracking occurring in a silicon (Si) substrate when its thickness is reduced, so that there is also a possibility of damage to a capacitance portion laminated on the substrate. In contrast, the thin-film capacitor 1 uses the insulating base member 30 which can be further reduced in thickness than a substrate formed of silicon, nickel, or the like. Due to such a configuration, compared to substrates used in general thin-film capacitors, the capacitance portion 10 can be supported while being reduced in thickness. Accordingly, the thin-film capacitor 1 can be reduced in length. In addition, in this thin-film capacitor 1, the relative dielectric constant of the dielectric layers 12 is 100 or higher, and relative dielectric constant is improved for dielectric layers used in general film capacitors and the like. Accordingly, the thin-film capacitor is increased in capacitance. Therefore, high functionality of the thin-film capacitor can be achieved while reduction in length is realized.

In addition, in the thin-film capacitor 1, the modulus of elasticity of the insulating base member 30 is within a range of 5 GPa to 25 GPa. Accordingly, the rigidity of the insulating base member 30 can be enhanced, so that damage to the thin-film capacitor 1 due to an external force or the like can be curbed.

In addition, in the thin-film capacitor 1, the dielectric layers 12 are baked. Accordingly, the relative dielectric constant of the dielectric layers 12 can be improved through baking, so that the thin-film capacitor 1 can be increased in capacitance. A Perovskite-based dielectric material is favorably used for the dielectric layers 12 of the thin-film capacitor 1 according to the present embodiment. A Perovskite-based dielectric material can have a relative dielectric constant of 100 or higher through baking. A material which can have a relative dielectric constant of 100 or higher even if baking is not performed can be used as the dielectric layers 12 without performing baking.

In addition, the method for manufacturing the thin-film capacitor 1 according to the present embodiment includes the baking step of baking the laminate W including the dielectric films 12a. In this manner, the relative dielectric constant of the dielectric layers 12 can be improved by baking the dielectric films 12a and forming the dielectric layers 12. In addition, in this manufacturing method, in the baking step, the support member 60 is used, and the support member 60 is removed after the baking step, thereby forming the insulating base member 30 supporting the capacitance portion 10. Accordingly, in the baking step, a material which can withstand the temperature during baking is used for the support member 60, and after the baking step, the insulating base member 30 can be formed of a material more suitable for being reduced in length. Accordingly, the thin-film capacitor is increased in capacitance. Therefore, high functionality of the thin-film capacitor can be achieved while reduction in length is realized.

In addition, in the method for manufacturing the thin-film capacitor 1, in the laminating step, the protective layer 50 is provided between the support member 60 and the internal electrode layer 11 positioned closest to the support member 60 side. Due to the protective layer 50 provided in this manner, the internal electrode layers 11 (capacitance portion 10) can be protected when the support member 60 is removed. Accordingly, damage to the internal electrode layer 11 positioned closest to the support member 60 side can be curbed.

Second Embodiment

Figure 7:
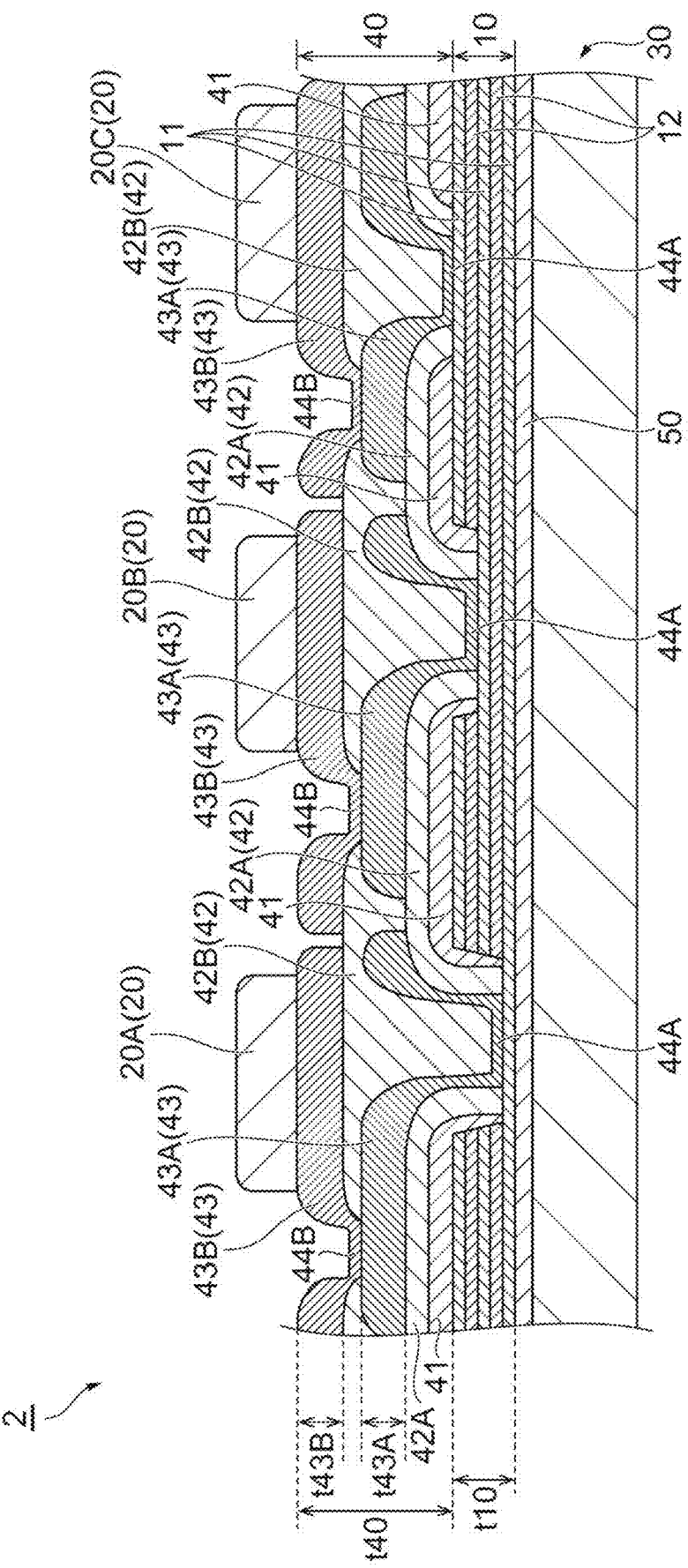
FIG. 7 is a cross-sectional view schematically illustrating a part of a thin-film capacitor according to a second embodiment of the present invention.
Figure 8:
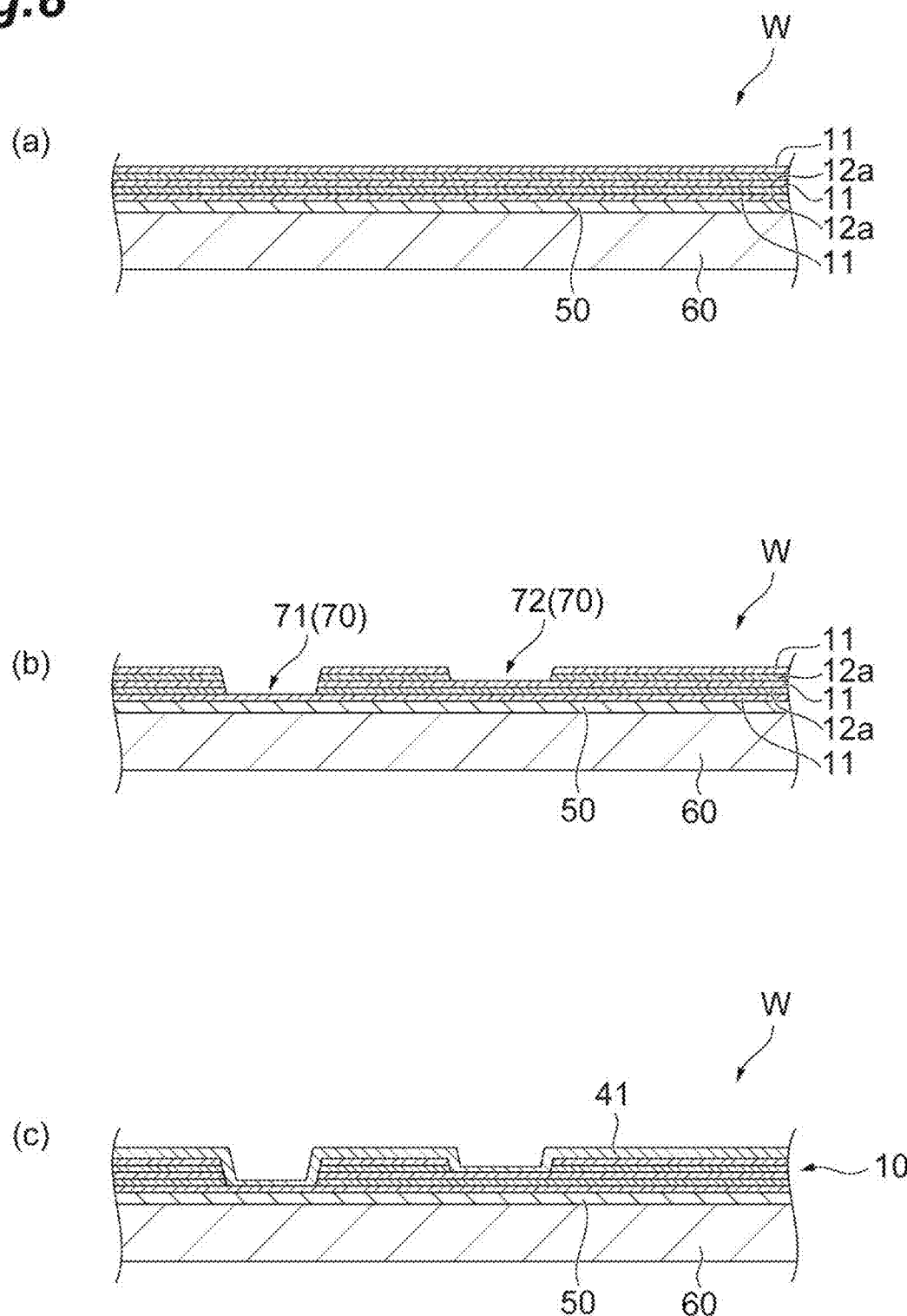
FIGS. 8(a), 8(b), and 8(c) are views for describing a method for manufacturing the thin-film capacitor illustrated in FIG. 7.
Figure 9:
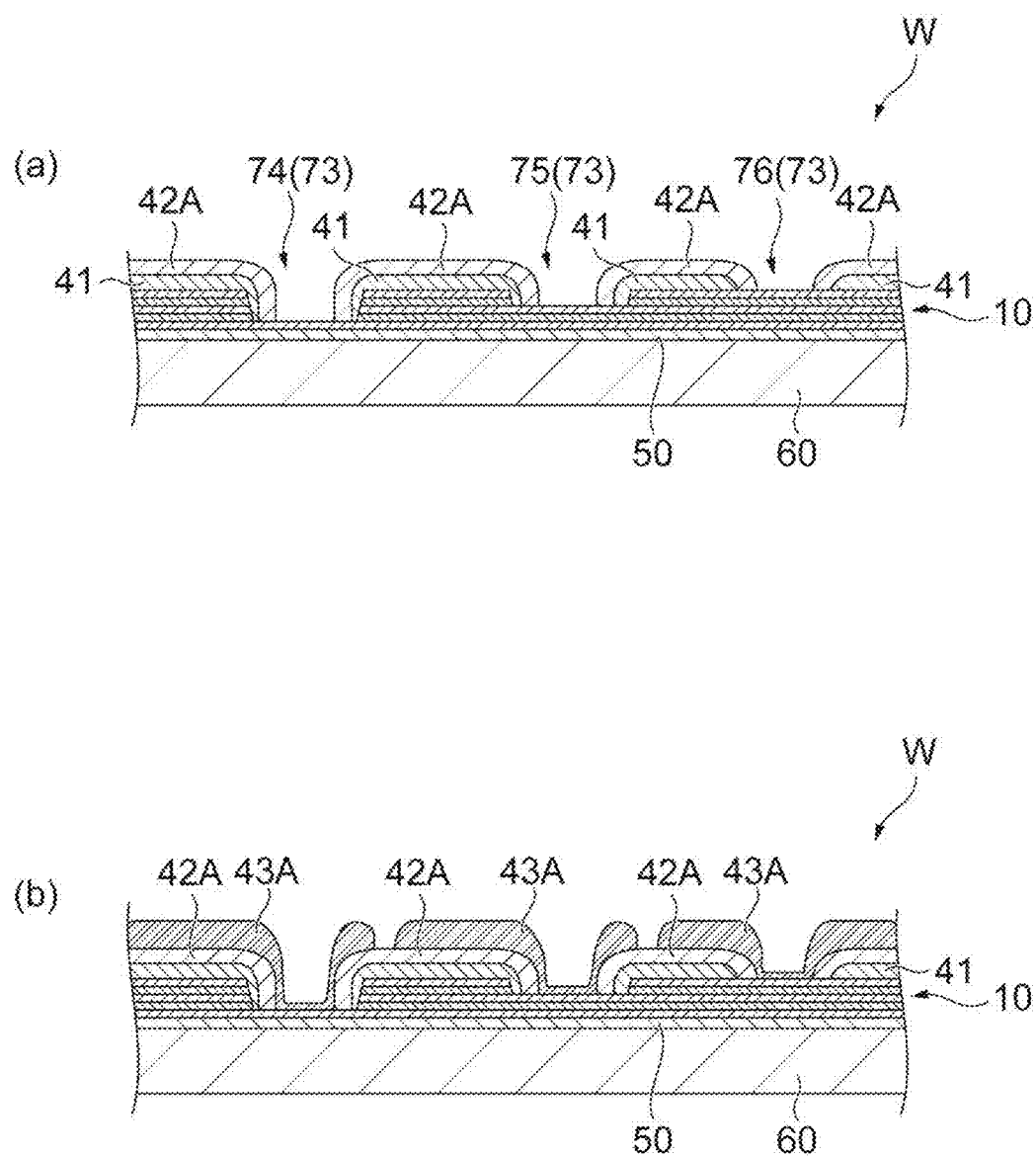
FIGS. 9(a) and 9(b) are views for describing the method for manufacturing the thin-film capacitor illustrated in FIG. 7.
Figure 10:
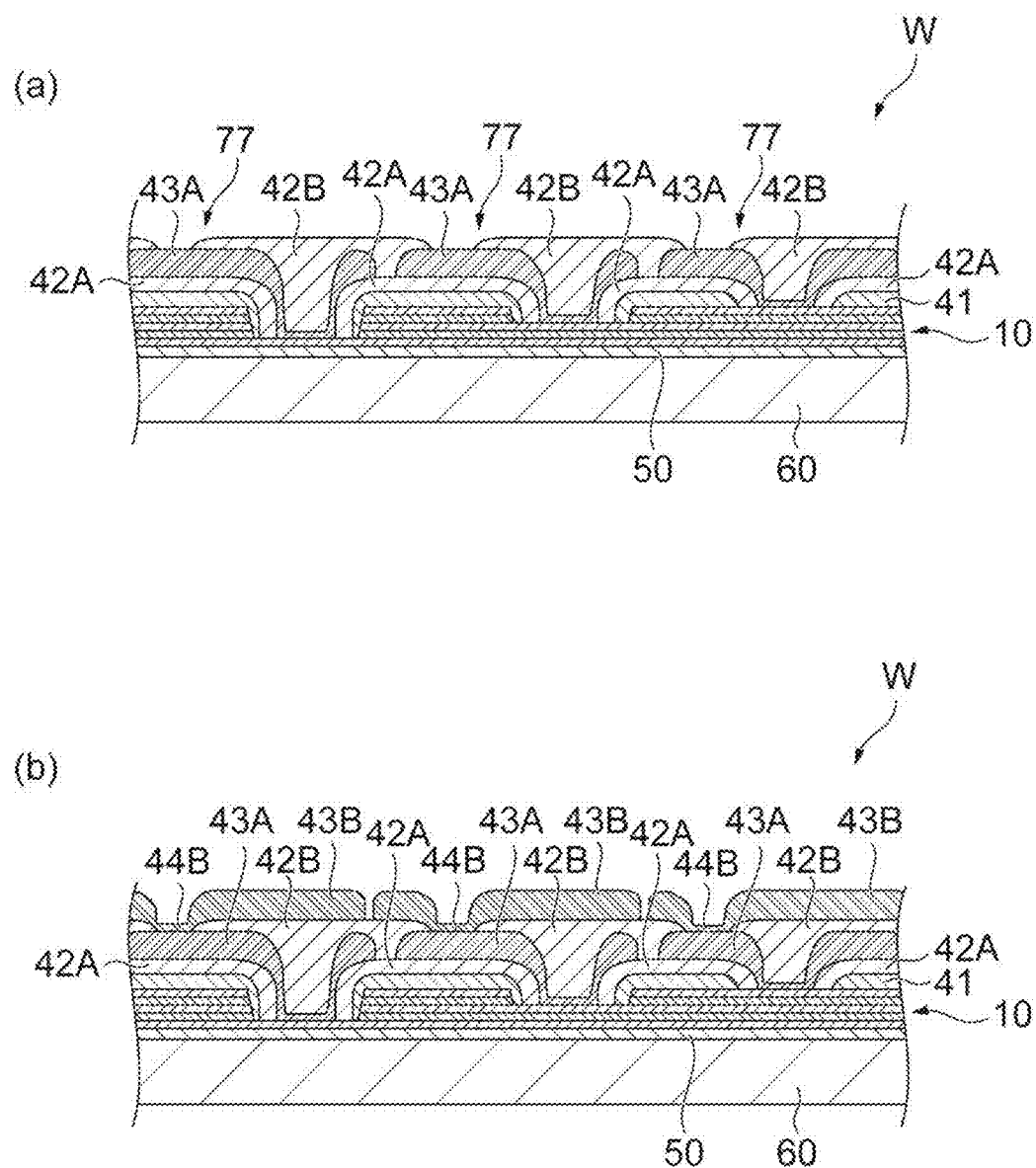
FIGS. 10(a) and 10(b) are views for describing the method for manufacturing the thin-film capacitor illustrated in FIG. 7.
Figure 11:
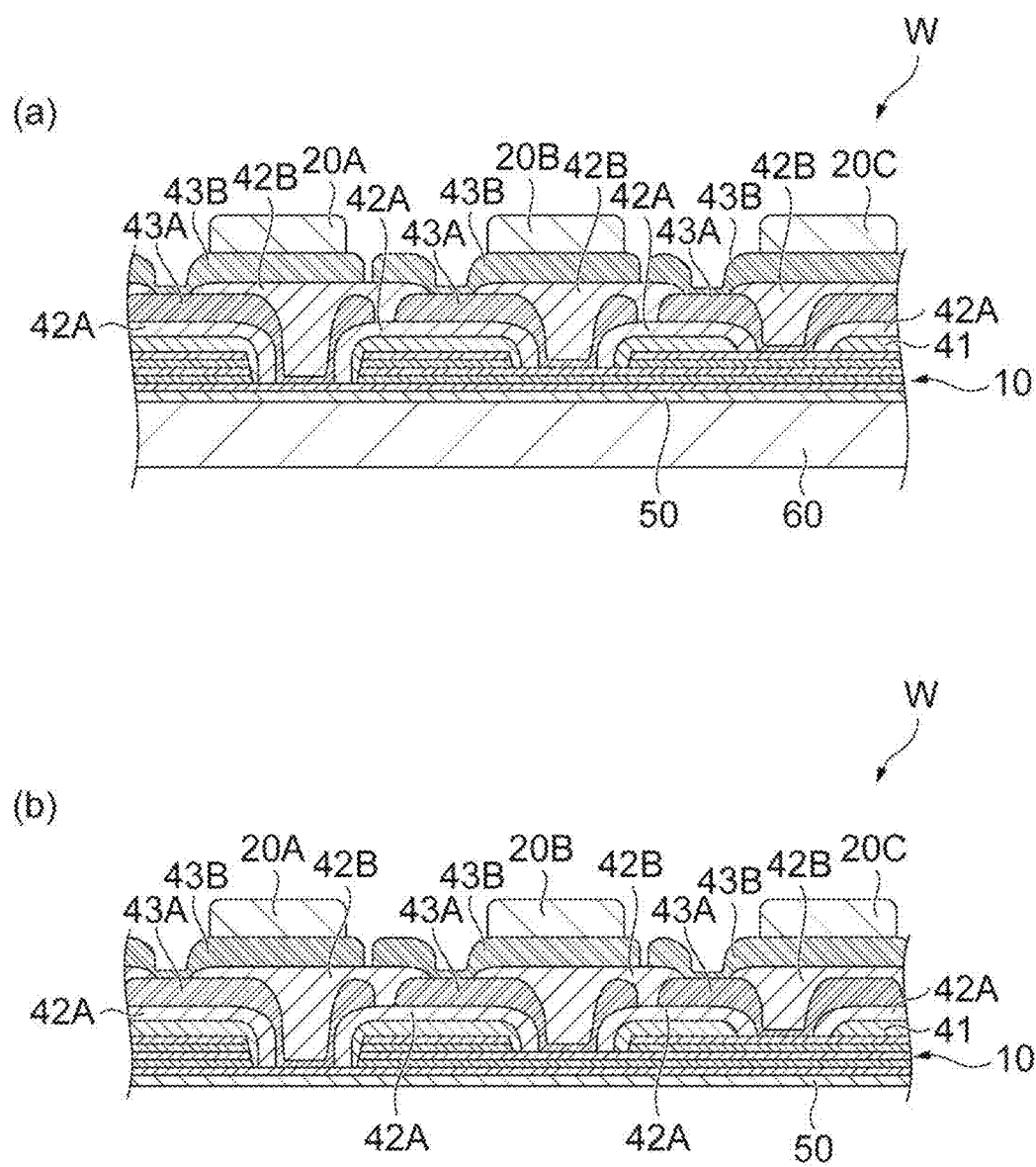
FIGS. 11(a) and 11(b) are views for describing the method for manufacturing the thin-film capacitor illustrated in FIG. 7.

Next, with reference to FIG. 7, a thin-film capacitor 2 according to a second embodiment of the present invention will be described. FIG. 7 is a cross-sectional view schematically illustrating a part of the thin-film capacitor according to the second embodiment of the present invention. Similar to the thin-film capacitor 1, the thin-film capacitor 2 internally has the capacitance portion 10 as a capacitor structure and has the electrode terminals 20 as electrode terminals drawn out from the capacitance portion 10. The capacitance portion 10 and the electrode terminals 20 are laminated on the insulating base member 30. The wiring portion 40 laminated on the capacitance portion 10 is provided between the capacitance portion 10 and the electrode terminals 20. The wiring portion 40 has wiring layers 43 (first wiring layers 43A and second wiring layers 43B) which electrically connect the capacitance portion 10 and the electrode terminals 20 to each other and insulating layers 42 (first insulating layers 42A and second insulating layers 42B) which cover the capacitance portion 10. In addition, the thin-film capacitor 2 includes the protective layer 50 between the capacitance portion 10 and the insulating base member 30. Since each of the constituent elements of the thin-film capacitor 2 is substantially the same as that of the thin-film capacitor 1, detailed description thereof will be omitted.

Here, a relationship between the coefficient of thermal expansion of the capacitance portion 10 and the coefficient of thermal expansion of the wiring portion 40 in the thin-film capacitor 2, and a relationship between a thickness t10 of the capacitance portion 10 and a thickness t40 of the wiring portion 40 will be described. In the thin-film capacitor 2, the coefficients of thermal expansion of the first insulating layers 42A and the second insulating layers 42B included in the wiring portion 40 are larger than the coefficients of thermal expansion of the first wiring layers 43A, the second wiring layers 43B, and the capacitance portion 10. In addition, the sum of a thickness t43A of the first wiring layer 43A and a thickness t43B of the second wiring layer 43B (thickness of the wiring layer 43) is larger than the thickness t10 of the capacitance portion 10. Accordingly, the thickness t40 of the wiring portion 40 is larger than the thickness t10 of the capacitance portion 10. Moreover, the sum of the thickness t43A of the first wiring layer 43A and the thickness t43B of the second wiring layer 43B (thickness of the wiring layer 43) is within a range of 40% to 70% of the thickness t40 of the wiring portion 40. In this manner, the coefficient of thermal expansion of the wiring portion 40 can be decreased by raising the ratio of the first wiring layers 43A and the second wiring layers 43B having a relatively low coefficient of thermal expansion to the first insulating layers 42A and the second insulating layers 42B having a relatively high coefficient of thermal expansion. Accordingly, a deviation in coefficient of thermal expansion between the wiring portion 40 and the capacitance portion 10 is alleviated.

The term "a coefficient of thermal expansion of the capacitance portion 10" indicates the average coefficient of thermal expansion calculated based on the ratio of the thicknesses of the internal electrode layers 11 and the dielectric layers 12 included in the capacitance portion 10, the coefficients of thermal expansion of the layers, and the like. Similarly, the term "a coefficient of thermal expansion of the wiring portion 40" indicates the average coefficient of thermal expansion calculated based on the ratio of the thicknesses of the first insulating layers 42A, the second insulating layers 42B, the first wiring layers 43A, and the second wiring layers 43B included in the wiring portion 40, the coefficient of thermal expansion of the layers, and the like.

Here, the term "a thickness of the first insulating layer 42A" indicates a distance between the upper surface of the passivation layer 41 and the upper surface of the first insulating layer 42A. In addition, the term "a thickness of the second insulating layer 42B" indicates a distance between the upper surface of the first insulating layer 42A and the upper surface of the second insulating layer 42B. In addition, the term "the thickness t43A of the first wiring layer 43A" indicates a distance between the upper surface of the first insulating layer 42A and the upper surface of the first wiring layer 43A. In addition, the term "a thickness t43B of the second wiring layer 43B" indicates a distance between the upper surface of the second insulating layer 42B and the upper surface of the second wiring layer 43B. For example, a conductive material such as copper (Cu) can be used for the first wiring layers 43A and the second insulating layers 42B. The first wiring layers 43A and the second insulating layers 42B may have a multi-layer structure using chromium (Cr), nickel (Ni), or the like for an adhesion layer.

As an example, the thickness of the internal electrode layer 11 of the capacitance portion 10 is within a range of approximately 10 nm to 1,000 nm. In addition, for example, the coefficient of thermal expansion (CTE) of the internal electrode layers 11 is within a range of 9 ppm to 15 ppm. For example, the thickness of the dielectric layer 12 of the capacitance portion 10 is within a range of 10 nm to 1,000 nm. For example, the coefficient of thermal expansion of the dielectric layers 12 is within a range of 8 ppm to 18 ppm. For example, the thickness of the first insulating layer 42A is within a range of 0.5 μm to 10 μm. For example, the thickness of the second insulating layer 42B is within a range of 0.5 μm to 10 μm. In addition, for example, the coefficients of thermal expansion of the first insulating layers 42A and the second insulating layers 42B are within a range of 30 ppm to 60 ppm. For example, the thickness t43A of the first wiring layer 43A is within a range of 10 μm to 20 μm. For example, the thickness t43B of the second wiring layer 43B is within a range of 10 μm to 20 μm. In addition, for example, the coefficients of thermal expansion of the first wiring layers 43A and the second wiring layers 43B are within a range of 10 ppm to 20 ppm.

Next, with reference to FIGS. 8 to 11, the method for manufacturing the thin-film capacitor 2 will be described. FIGS. 8 to 11 are views for describing the method for manufacturing the thin-film capacitor 2. FIGS. 8 to 11 illustrate enlarged parts of the thin-film capacitor 2 in a stage in the middle of manufacturing. Actually, a plurality of thin-film capacitors 2 are formed at one time. Thereafter, they are divided into individual pieces of the thin-film capacitor 2.

The thin-film capacitor 2 can be manufactured by a method similar to that for the thin-film capacitor 1. First, as illustrated in FIG. 8(a), the support member 60 is prepared, and the protective layer 50 is laminated on the support member 60. Thereafter, the internal electrode layers 11 and the dielectric films 12a serving as the dielectric layers 12 are alternately laminated on the protective layer 50, thereby forming the laminate W (laminating step). Through this step, a part serving as the capacitance portion 10 is formed.

Next, as illustrated in FIG. 8(b), the predetermined openings 70 penetrating the internal electrode layers 11 and the dielectric films 12a are formed through etching or the like. Through this step, two openings 71 and 72 are formed in the internal electrode layers 11 and the dielectric films 12a.

Thereafter, the laminate W is baked (baking step). Through this step, the dielectric films 12a are sintered, thereby forming the capacitance portion 10 (refer to FIG. 8(c)). Regarding the temperature during baking, the baking time, the atmosphere during baking, and the like, conditions similar to those for the method for manufacturing the thin-film capacitor 1 can be used.

Next, as illustrated in FIG. 8(c), the passivation layers 41 are formed. Accordingly, the upper surface of the laminate W and the bottom surfaces and the side surfaces of the openings 70 are in a state of being covered with the passivation layers 41.

Next, as illustrated in FIG. 9(a), the passivation layers 41 formed on the bottom surfaces of the openings 70 (refer to FIG. 8(b)) are removed, and the first insulating layers 42A are formed such that the passivation layers 41 are covered. Thereafter, the openings 73 for providing the first wiring layers 43A through dry etching or the like are formed. In the present embodiment, three openings 74, 75, and 76 are formed as the openings 73. The opening 74 is formed near the center of the opening 71 such that the first insulating layer 42A inside the opening 71 is penetrated. In addition, the opening 75 is formed near the center inside the opening 72 such that the first insulating layer 42A inside the opening 72 is penetrated. Moreover, the opening 76 is formed to penetrate the first insulating layer 42A in a predetermined region. Through this step, the internal electrode layer 11 positioned on the lowermost side of the three internal electrode layers 11 is in a state of being exposed to the bottom surface of the opening 74. The internal electrode layer 11 positioned in the middle of the three internal electrode layers 11 is in a state of being exposed to the bottom surface of the opening 75. The internal electrode layer 11 positioned on the uppermost side of the three internal electrode layers 11 is in a state of being exposed to the bottom surface of the opening 76.

Next, as illustrated in FIG. 9(b), the first wiring layers 43A are formed inside the openings 73 of the first insulating layers 42A and on the first insulating layers 42A at the peripheral edges of the openings 73. Through this step, a plurality of first wiring layers 43A electrically independent from each other are formed. At this time, the first wiring layer 43A formed around the opening 74 is in a state of being electrically connected to the internal electrode layer 11 on the lowermost side of the three internal electrode layers 11. The first wiring layer 43A formed around the opening 75 is in a state of being electrically connected to the internal electrode layer 11 positioned in the middle of the three internal electrode layers 11. The first wiring layer 43A formed around the opening 76 is in a state of being electrically connected to the internal electrode layer 11 on the uppermost side of the three internal electrode layers 11.

Next, as illustrated in FIG. 10(a), the second insulating layers 42B are formed on the first insulating layers 42A and on the first wiring layers 43A. After the second insulating layers 42B are formed, three openings 77 for forming the second wiring layers 43B through dry etching or the like are formed. Through this step, the first wiring layers 43A are in a state of being exposed to the openings 77 respectively.

Next, as illustrated in FIG. 10(b), the second wiring layers 43B are formed inside the openings 77 of the second insulating layers 42B and on the second insulating layers 42B at the peripheral edges of the openings 77. Through this step, a plurality of second wiring layers 43B electrically independent from each other are formed. At this time, the second wiring layers 43B formed around the openings 77 are electrically connected to the first wiring layers 43A respectively, thereby forming the wiring portion 40.

Next, as illustrated in FIG. 11(a), the electrode terminals 20A, 20B, and 20C for electrically connecting the thin-film capacitor 1 to an external electronic component are formed on the second wiring layers 43B. Thereafter, as illustrated in FIG. 11(b), the support member 60 is removed from the laminate W. Through this step, the protective layer 50 is in a state of being exposed to the side below the laminate W. Thereafter, the insulating base member 30 supporting the capacitance portion 10 is formed on the surface of the laminate W exposed through the removing step, that is, the surface of the protective layer 50 (a surface on a side opposite to the side on which the capacitance portion 10 is laminated, and a surface illustrated on the lower side in FIG. 11(b)) exposed to the side below the laminate W. Lastly, the laminate W is divided into individual pieces through dicing or the like, thereby obtaining the thin-film capacitor 2 illustrated in FIG. 7.

Similar to the thin-film capacitor 1, the thin-film capacitor 2 may be manufactured through the steps illustrated in FIGS. 6(a) to 6(c), after the protective layer 50, the capacitance portion 10, and the wiring portion 40 are formed on the support member 60 through the steps in FIGS. 8(a) to 10(b).

As described above, in the thin-film capacitor 2 according to the second embodiment, the coefficients of thermal expansion of the first insulating layers 42A and the second insulating layers 42B are larger than the coefficients of thermal expansion of the first wiring layers 43A and the second wiring layers 43B, and the coefficient of thermal expansion of the capacitance portion 10. The sum of the thickness t43A of the first wiring layer 43A and the thickness t43B of the second wiring layer 43B (thickness of the wiring layer 43) is larger than the thickness t10 of the capacitance portion 10. In ordinary thin-film capacitors, since a resin material such as an insulating resin is used as a material of an insulating layer, the coefficient of thermal expansion of the insulating layer is larger than the coefficient of thermal expansion of the capacitance portion. Therefore, warpage is likely to occur due to a deviation in coefficient of thermal expansion between the wiring portion and the capacitance portion. Particularly, an influence caused by such a deviation in coefficient of thermal expansion is likely to occur when heating treatment is performed in the middle of manufacturing thin-film capacitors, for example. In contrast, as in the thin-film capacitor 2 according to the second embodiment, when the sum of the thickness t43A of the first wiring layer 43A and the thickness t43B of the second wiring layer 43B (thickness of the wiring layer 43) included in the wiring portion 40 is larger than the thickness t10 of the capacitance portion 10, the average coefficient of thermal expansion of the wiring portion 40 can be decreased. As a result, a deviation in coefficient of thermal expansion between the wiring portion 40 and the capacitance portion 10 is alleviated. Accordingly, warpage derived from the difference between the coefficients of thermal expansion can be curbed. Therefore, warpage of the thin-film capacitor 2 can be reduced while reduction in length is realized. In addition, since a deviation in coefficient of thermal expansion between the wiring portion 40 and the capacitance portion 10 is alleviated, damage to the thin-film capacitor 2 due to warpage can be curbed, so that high functionality of the thin-film capacitor can be achieved.

In addition, in the thin-film capacitor 2, the sum of the thickness t43A of the first wiring layer 43A and the thickness t43B of the second wiring layer 43B (thickness of the wiring layer 43) is within a range of 40% to 70% of the thickness t40 of the wiring portion 40. Accordingly, the ratio of the first wiring layers 43A and the second wiring layers 43B having a relatively low coefficient of thermal expansion to the first insulating layers 42A and the second insulating layers 42B having a relatively high coefficient of thermal expansion can be raised. Accordingly, the average coefficient of thermal expansion of the wiring portion 40 can be decreased. As a result, a deviation in coefficient of thermal expansion between the wiring portion 40 and the capacitance portion 10 is alleviated. Accordingly, warpage derived from the difference between the coefficients of thermal expansion can be curbed. Therefore, warpage of the thin-film capacitor 2 can be reduced while reduction in length is realized.

Third Embodiment

Next, with reference to FIG. 1 again, a thin-film capacitor 3 according to a third embodiment of the present invention will be described. As illustrated in FIG. 1, similar to the thin-film capacitor 1, the thin-film capacitor 3 internally has the capacitance portion 10 as a capacitor structure and has the electrode terminals 20 as electrode terminals drawn out from the capacitance portion 10. The capacitance portion 10 and the electrode terminals 20 are laminated on the insulating base member 30. The wiring portion 40 laminated on the capacitance portion 10 is provided between the capacitance portion 10 and the electrode terminals 20. The wiring portion 40 has the wiring layers 43 (first wiring layers 43A and second wiring layers 43B) which electrically connect the capacitance portion 10 and the electrode terminals 20 to each other and the insulating layers 42 (first insulating layers 42A and second insulating layers 42B) which cover the capacitance portion 10. In addition, the thin-film capacitor 3 includes the protective layer 50 between the capacitance portion and the insulating base member 30. Since each of the constituent elements of the thin-film capacitor 3 and the method for manufacturing the thin-film capacitor 3 is substantially the same as those of the thin-film capacitor 1, detailed description thereof will be omitted.

Here, in the thin-film capacitor 3 according to the third embodiment, materials of the insulating base member 30, and the first insulating layers 42A and the second insulating layers 42B (insulating layers) are selected such that the difference between the coefficients of thermal expansion (CTE) of the insulating layers constituted of the first insulating layers 42A and the second insulating layers 42B and the coefficient of thermal expansion of the insulating base member 30 is within a range of −10 to +50. In other words, the coefficient of thermal expansion of the insulating layer is set within a range of −10 of the coefficient of thermal expansion of the insulating base member 30 to +50 of the coefficient of thermal expansion of the insulating base member 30. Due to such a configuration, warpage of the thin-film capacitor 3 in its entirety can be curbed.

The thin-film capacitor 3 according to the third embodiment has been made thinner on recent demand for reduction in length of electronic components. Such a thin-film capacitor 3 has a problem that warpage is likely to occur due to the difference between the coefficients of thermal expansion of the insulating base member 30 and the capacitance portion 10 on the insulating base member 30. When warpage occurs in the thin-film capacitor 3, a possibility of damage to the capacitance portion 10 due to the influence of warpage is conceived. In addition, the thin-film capacitor 3 is sometimes mounted on a circuit board or the like via the electrode terminals 20 drawn out from the capacitance portion 10. However, if warpage occurs in the thin-film capacitor 3, there is also a possibility that contact failure or the like may occur between the electrode terminals 20 and a circuit board. In contrast, in the thin-film capacitor 3 according to the third embodiment, the difference between the coefficient of thermal expansion of the insulating base member 30 and the coefficients of thermal expansion of the insulating layers constituted of the first insulating layers 42A and the second insulating layers 42B is controlled to be within a range of −10 to +50. As described above, the cause of warpage occurring in the thin-film capacitor 3 is derived from the difference between the coefficients of thermal expansion of the insulating base member 30 and the capacitance portion 10. Here, warpage of the thin-film capacitor 3 in its entirety can be curbed by controlling the coefficient of thermal expansion of the insulating layer provided on a side opposite to the insulating base member 30 with the capacitance portion 10 sandwiched therebetween.

Specifically, when the difference between the coefficients of thermal expansion of the insulating layer and the insulating base member 30 is set within a range of approximately −10 to +10 (when the coefficient of thermal expansion of the insulating layer is set within a range of approximately −10 to +10 of the coefficient of thermal expansion of the insulating base member 30), the difference between the coefficient of thermal expansion of the insulating base member 30 on one side of the main surface of the capacitance portion 10 and the coefficient of thermal expansion of the wiring portion 40 on the other side can be reduced. The wiring portion 40 also includes the first wiring layers 43A and the second wiring layers 43B. However, generally, compared to the first wiring layers 43A and the second wiring layers 43B, the ratio of the first insulating layers 42A and the second insulating layers 42B to the wiring portion 40 increases. Therefore, the coefficient of thermal expansion of the insulating layer significantly contributes to the coefficient of thermal expansion of the wiring portion 40 in its entirety. A deviation in the thin-film capacitor 3 on both sides of the capacitance portion 10 can be reduced due to a configuration in which the coefficient of thermal expansion of this insulating layer is close to that of the insulating base member 30.

As described above, in order to make the difference between the coefficients of thermal expansion of the insulating base member 30 and the insulating layer be within a range of approximately −10 to +10, for example, the material forming the insulating base member 30 and the material forming the insulating layer can be the same as each other. When the insulating base member 30 and the insulating layer are formed of the same material, the difference between the coefficients of thermal expansion of the insulating base member 30 and the insulating layer becomes zero, so that the difference between the coefficients of thermal expansion of the insulating base member 30 and the wiring portion 40 can be further reduced. In addition, even when the material forming the insulating base member 30 and the material forming the insulating layer are different from each other, the difference between the coefficients of thermal expansion can be controlled within the foregoing range by selecting the material. Examples of specific combinations of materials include a combination in which polyimide is used as the material forming the insulating layers (first insulating layers 42A and the second insulating layers 42B) and an insulating resin mixed with glass cloth is used as the material forming the insulating base member 30. The coefficient of thermal expansion can be adjusted by mixing a material such as glass cloth, silica, or the like with a resin material.

In addition, when the difference between the coefficients of thermal expansion of the insulating base member 30 and the insulating layer is set within a range of approximately +10 to +50 (when the coefficient of thermal expansion of the insulating base member 30 is set within a range of approximately +10 to +50 of the coefficient of thermal expansion of the insulating layer), the coefficient of thermal expansion of the insulating base member 30 on one side of the main surface of the capacitance portion 10 is in a state of being lower than the coefficient of thermal expansion of the wiring portion 40 on the other side. Therefore, the thin-film capacitor 3 is warped such that the end portion on the insulating base member 30 side is directed downward. However, when being mounted on a circuit board, the thin-film capacitor 3 is attached to the circuit board such that the end portion on the insulating base member 30 side is in a state of being directed upward. Accordingly, the electrode terminals 20 and the circuit board can be appropriately maintained compared to a case of being warped to the opposite side.

However, generally, the capacitance portion 10 provided between the insulating base member 30 and the wiring portion 40 including the insulating layer has a lower coefficient of thermal expansion than those of the insulating base member 30 and the wiring portion 40. Accordingly, compression stress derived from the coefficients of thermal expansion of the insulating base member 30 and the wiring portion 40 is offset due to the capacitance portion 10. Therefore, even when the difference between the coefficients of thermal expansion of the insulating base member 30 and the insulating layer with the capacitance portion 10 sandwiched therebetween is set within a range of approximately +10 to +50, warpage of the thin-film capacitor 3 can be controlled to be small.

As described above, in order to make the difference between the coefficients of thermal expansion of the insulating base member 30 and the insulating layer be within a range of approximately +10 to +50, the material forming the insulating base member 30 and the insulating layer are selected such that the foregoing relationship is satisfied. Examples of specific combinations of materials include a combination in which an epoxy resin having a coefficient of thermal expansion (CTE) within a range of 10 ppm to 40 ppm is used as the material forming the insulating base member 30 and an epoxy resin having a coefficient of thermal expansion (CTE) within a range of 30 ppm to 60 ppm is used as the material forming the insulating layers (first insulating layers 42A and the second insulating layers 42B).

The coefficient of thermal expansion of the insulating layer is the average value of the coefficients of thermal expansion of the insulating layers constituted of the first insulating layers 42A and the second insulating layers 42B. That is, when the first insulating layers 42A and the second insulating layers 42B are formed of materials different from each other, the average value of the coefficients of thermal expansion calculated from the volume of each of the first insulating layers 42A and the second insulating layers 42B, and the coefficient of thermal expansion of the material forming each thereof is set as the coefficient of thermal expansion of the insulating layer.

As described above, in the thin-film capacitor 3 according to the third embodiment, the capacitance portion 10 is laminated on the insulating base member 30. In ordinary thin-film capacitors, for example, a capacitance portion is laminated on a substrate formed of silicon (Si), nickel (Ni), or the like. However, it is difficult to further reduce the thickness (for example, smaller than 20 μm) of a substrate formed of these materials. Particularly, there is a possibility of damage such as cracking occurring in a silicon (Si) substrate when its thickness is reduced, so that there is also a possibility of damage to a capacitance portion laminated on the substrate. In contrast, the thin-film capacitor 3 uses the insulating base member 30 which can be further reduced in thickness than a substrate formed of silicon, nickel, or the like. Due to such a configuration, compared to substrates used in general thin-film capacitors, the capacitance portion 10 can be supported while being reduced in thickness. Accordingly, the thin-film capacitor 3 can be reduced in length. In addition, in this thin-film capacitor 3, since the difference between the coefficients of thermal expansion of the insulating layers provided on both sides of the capacitance portion 10 and the coefficient of thermal expansion of the insulating base member 30 is within a range of −10 to +50, warpage of the thin-film capacitor 3 is curbed as described above. Therefore, warpage and the like can be curbed while reduction in length is realized, so that high functionality can be achieved.

Hereinabove, the embodiments of the present invention have been described. However, the present invention is not limited to each of the foregoing embodiments, and various changes can be made. For example, in the foregoing first to third embodiments, a case in which the capacitance portion 10 has three internal electrode layers 11 and two dielectric layers 12 has been described. However, the number of internal electrode layers 11 and dielectric layers 12 included in the capacitance portion 10 is not particularly limited and the number can be arbitrarily changed. For example, the capacitance portion 10 may have only two internal electrode layers 11 and one dielectric layer 12 (single capacitor structure) or may have more internal electrode layers 11 and dielectric layers 12.

In addition, in the foregoing first to third embodiments, a case in which the protective layer 50 is provided between the insulating base member 30 and the capacitance portion 10 has been described. However, the protective layer 50 does not have to be provided. In this case, damage to the capacitance portion 10 in the removing step may be curbed by further increasing the thickness of the internal electrode layer 11, of the three internal electrode layers 11, positioned closest to the insulating base member 30 side than the thicknesses of the remaining internal electrode layers 11.

In addition, in the foregoing second and third embodiments, the relative dielectric constant of the dielectric layers 12 is improved by baking the dielectric films 12a. However, the dielectric layers 12 do not have to be baked.

REFERENCE SIGNS LIST 1, 2, 3 Thin-film capacitor
10 Capacitance portion
11 Internal electrode layer
12 Dielectric layer
12a Dielectric film
20A, 20B, and 20C Electrode terminal
30 Insulating base member
40 Wiring portion
41 Passivation layer
42 Insulating layer
42A First insulating layer
42B Second insulating layer
43 Wiring layer
43A First wiring layer
43B Second wiring layer
50 Protective layer
60 Support member
W Laminate

The invention claimed is:

1. A thin-film capacitor comprising:
an insulating base member; and
a capacitance portion that is laminated on the insulating base member and has a plurality of internal electrode layers which are provided in a lamination direction and dielectric layers which are sandwiched between the internal electrode layers,
wherein a relative dielectric constant of the dielectric layers is 100 or higher, and
a modulus of elasticity of the insulating base member is within a range of 5 GPa to 25 GPa.

2. The thin-film capacitor according to claim 1,
wherein the dielectric layers are baked.

3. A method for manufacturing a thin-film capacitor comprising:
a laminating step of laminating a plurality of internal electrode layers and dielectric films sandwiched between the internal electrode layers on a support member and forming a laminate;
a baking step of baking the laminate and forming dielectric layers from the dielectric films;
a removing step of removing the support member from the laminate after the baking step; and an insulating base member-forming step of forming an insulating base member on a surface of the laminate exposed through the removing step.

4. The method for manufacturing a thin-film capacitor according to claim 3,
wherein in the laminating step, a protective layer is provided between the support member and the internal electrode layer positioned closest to the support member side.

5. A thin-film capacitor comprising:
a capacitance portion that has a plurality of internal electrode layers and dielectric layers sandwiched between the internal electrode layers; and
a wiring portion that is laminated on the capacitance portion and has an insulating layer covering a wiring layer and the capacitance portion electrically connected to the internal electrode layers,
wherein a coefficient of thermal expansion of the insulating layer is higher than a coefficient of thermal expansion of the wiring layer and a coefficient of thermal expansion of the capacitance portion, and
wherein a thickness of the wiring layer is larger than a thickness of the capacitance portion.

6. The thin-film capacitor according to claim 5,
wherein the thickness of the wiring layer is within a range of 40% to 70% of a thickness of the wiring portion.

7. A thin-film capacitor comprising:
an insulating base member;
a capacitance portion that is laminated on the insulating base member and has a plurality of internal electrode layers which are provided in a lamination direction and dielectric layers which are sandwiched between the internal electrode layers; and
a wiring portion including a wiring layer electrically connected to the internal electrode layers and an insulating layer disposed on the capacitor portion and covering the capacitor portion, wherein the wiring layer and the insulating layer are disposed on the capacitor portion,
wherein a difference between a coefficient of thermal expansion of the insulating layer and a coefficient of thermal expansion of the insulating base member is within a range of −10 to +50.

8. The thin-film capacitor according to claim 7,
wherein the insulating layer and the insulating base member are formed of the same material.

9. The thin-film capacitor according to claim 1,
further comprising a protective layer between the insulating base member and the internal electrode layer located closest to the insulating base member among the plurality of internal electrode layers.

10. The thin-film capacitor according to claim 5,
wherein the capacitance portion is laminated on an insulating base member, and
further comprising a protective layer between the insulating base member and the internal electrode layer located closest to the insulating base member among the plurality of internal electrode layers.

11. The thin-film capacitor according to claim 7,
further comprising a protective layer between the insulating base member and the internal electrode layer located closest to the insulating base member among the plurality of internal electrode layers.

12. A thin-film capacitor comprising:
an insulating base member;
a capacitance portion that is laminated on the insulating base member and has a plurality of internal electrode layers which are provided in a lamination direction and dielectric layers which are sandwiched between the internal electrode layers; and
a wiring portion that is laminated on the capacitance portion and has an insulating layer covering a wiring layer and the capacitance portion electrically connected to the internal electrode layers,
wherein a relative dielectric constant of the dielectric layers is 100 or higher,
a modulus of elasticity of the insulating base member is within a range of 5 GPa to 25 GPa, and
a thickness of the wiring layer is within a range of 40% to 70% of a thickness of the wiring portion.

* * * * *